(12) United States Patent
Negoita et al.

(10) Patent No.: US 12,458,845 B1
(45) Date of Patent: Nov. 4, 2025

(54) SYSTEMS AND METHODS FOR CAPTURE AND REPLAY OF USER-BASED ACTIVITIES

(71) Applicant: Apple Inc., Cupertino, CA (US)

(72) Inventors: Ioana Negoita, Mountain View, CA (US); Christopher I. Word, San Francisco, CA (US); Thomas J. Moore, Northglenn, CO (US); Joshua J. Frost, Aptos, CA (US); Trent A. Greene, Santa Clara, CA (US); Brian W. Temple, Santa Clara, CA (US); David Loewenthal, Seattle, WA (US); Ian Perry, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/886,753

(22) Filed: Sep. 16, 2024

Related U.S. Application Data

(60) Provisional application No. 63/583,568, filed on Sep. 18, 2023.

(51) Int. Cl.
| | |
|---|---|
| *G06T 15/10* | (2011.01) |
| *A63B 24/00* | (2006.01) |
| *G06F 3/01* | (2006.01) |
| *G06T 19/00* | (2011.01) |
| *G06V 20/20* | (2022.01) |

(52) U.S. Cl.
CPC ...... *A63B 24/0075* (2013.01); *A63B 24/0062* (2013.01); *G06F 3/013* (2013.01); *G06T 19/006* (2013.01); *G06V 20/20* (2022.01)

(58) Field of Classification Search
CPC ............ A63B 24/0075; A63B 24/0062; G06V 20/20; G06F 3/013; G06T 19/006; A63F 13/655
See application file for complete search history.

(56) References Cited

U.S. PATENT DOCUMENTS

2022/0101593 A1\* 3/2022 Rockel .................. A63F 13/655

OTHER PUBLICATIONS

Dirks, Brent, What Is Action Mode on iPhone 14 and iPhone 14 Pro?, Retrieved from: <https://www.makeuseof.com/what-is-action-mode-iphone-14-pro/>, [retrieved on: Mar. 6, 2025], Oct. 15, 2022, 97pages.

(Continued)

*Primary Examiner* — Abdul-Samad A Adediran
(74) *Attorney, Agent, or Firm* — Kubota & Basol LLP

(57) ABSTRACT

In some examples, an electronic device detects initiation of an exercise activity associated with a user of the electronic device. In some examples, in response to detecting the initiation of the exercise activity, the electronic device activates an image compilation capture mode of operation in which one or more images for formulating a compilation of the one or more images corresponding to the exercise activity are captured, including capturing one or more portions of a physical environment. In some examples, while the image compilation capture mode of operation is active, the electronic device visually detects a first object in the one or more captured portions of the physical environment. In some examples, in accordance with a determination that the first object satisfies one or more criteria, the electronic device generates a first event associated with formulating a first compilation of one or more images corresponding to the exercise activity.

24 Claims, 25 Drawing Sheets

(56) References Cited

OTHER PUBLICATIONS

Craig, Emory, An AR Running App and Glasses for a COVID-19 World, Retrieved from: <https://www.digitalbodies.net/an-ar-running-app-and-glasses-for-a-covid-19-world/>, [retrieved on: Mar. 6, 2025], Aug. 5, 2020, 9 pages.
App Experience Spartan Trailer, Klocked Fitness [online]. Klocked Fitness, 2022 [retrieved on Dec. 19, 2024]. Retrieved on the Internet: <https://www.klocked.me/>, 12 pages.
Matsuda, Keiichi, Hyper-Reality, 2016 [online]. [retrieved on Jan. 30, 2025], Retrieved from the Internet: <http://hyper-reality.co/>, 6 pages.
George, Lesley, Augmented Reality Is Transforming Our Runs, ShapeScale [online]. Retrieved from Internet Archive Wayback Machine: <https://web.archive.org/web/20230201021131/https://shapescale.com/blog/fit-tech/running-ar/>, on May 28, 2025, 6 pages.

* cited by examiner

SYSTEMS AND METHODS FOR CAPTURE AND REPLAY OF USER-BASED ACTIVITIES

CROSS-REFERENCE TO RELATED APPLICATIONS

This application claims the benefit of U.S. Provisional Patent Application No. 63/583,568, filed Sep. 18, 2023, the entire disclosure of which is herein incorporated by reference for all purposes.

FIELD OF THE DISCLOSURE

This relates generally to systems and methods of capture and replay of user-based activities as user-consumable content in a computer-generated environment.

BACKGROUND OF THE DISCLOSURE

Some computer graphical environments provide two-dimensional and/or three-dimensional environments where at least some objects displayed for a user's viewing are virtual and generated by a computer. In some examples, an electronic device detects a user of the electronic device initiating an activity in a physical environment surrounding the electronic device. In some examples, while the user is participating in the activity, one or more objects of interest present in the physical environment may be passively perceptible by the user.

SUMMARY OF THE DISCLOSURE

Some examples of the disclosure are directed to systems and methods for selectively capturing one or more images for formulation of a timelapse of a detected user activity. In some examples, the method is performed at an electronic device in communication with a display, one or more input devices, and one or more cameras. In some examples, while presenting, via the display, a computer-generated environment, the electronic device detects, via the one or more input devices, initiation of an exercise activity associated with a user of the electronic device. In some examples, in response to detecting the initiation of the exercise activity, the electronic device activates an image compilation capture mode of operation in which one or more images for formulating a compilation of the one or more images (e.g., a timelapse) corresponding to the exercise activity are captured, including capturing, via the one or more cameras, one or more portions of a physical environment that is visible in the computer-generated environment. In some examples, while the image compilation capture mode of operation is active, the electronic device visually detects, via the one or more cameras, a first object in the one or more captured portions of the physical environment. In some examples, in response to visually detecting the first object, in accordance with a determination that the first object satisfies one or more criteria, the electronic device generates a first event associated with formulating a first compilation of one or more images corresponding to the exercise activity. In some examples, in accordance with a determination that the first object does not satisfy the one or more criteria, the electronic device forgoes generating the first event associated with formulating the first compilation.

In some examples, the one or more criteria include a criterion that is satisfied if, while visually detecting the first object in the physical environment, the electronic device detects gaze of the user directed to the first object for at least a threshold amount of time. In some examples, the one or more criteria include a criterion that is satisfied if, based on user data provided by one or more applications running on the electronic device, the user has previously expressed interest in the first object and/or an object similar to the first object. In some examples, the one or more criteria include a criterion that is satisfied if, based on image data associated with previously formulated compilations at the electronic device, the first object has been included in captured images fewer than a threshold amount of times. In some examples, generating the first event includes capturing, via the one or more cameras, one or more images of the first object. In some examples, generating the first event includes generating metadata associated with the first object, such as information identifying the first object, information identifying a location of the first object, and/or information identifying a statistic associated with the first object.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
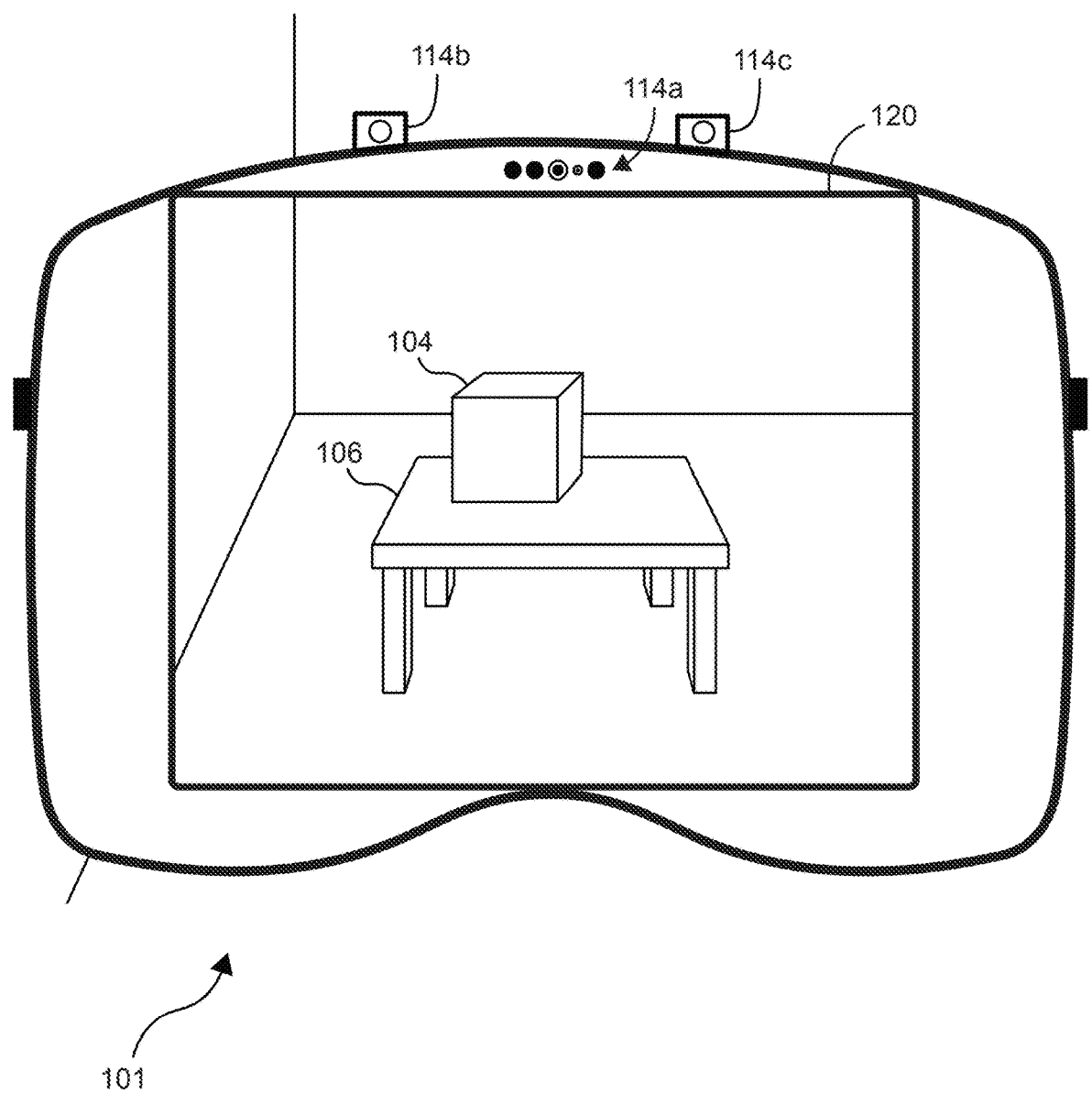
FIG. 1 illustrates an electronic device presenting an extended reality environment according to some examples of the disclosure.

Some examples of the disclosure are directed to systems and methods for selectively capturing one or more images for formulation of a timelapse of a detected user activity. In some examples, the method is performed at an electronic device in communication with a display, one or more input devices, and one or more cameras. In some examples, while presenting, via the display, a computer-generated environment, the electronic device detects, via the one or more input devices, initiation of an exercise activity associated with a user of the electronic device. In some examples, in response to detecting the initiation of the exercise activity, the electronic device activates an image compilation capture mode of operation in which one or more images for formulating a compilation of the one or more images (e.g., a timelapse) corresponding to the exercise activity are captured, including capturing, via the one or more cameras, one or more portions of a physical environment that is visible in the computer-generated environment. In some examples, while the image compilation capture mode of operation is active, the electronic device visually detects, via the one or more cameras, a first object in the one or more captured portions of the physical environment. In some examples, in response to visually detecting the first object, in accordance with a determination that the first object satisfies one or more criteria, the electronic device generates a first event associated with formulating a first compilation of one or more images corresponding to the exercise activity. In some examples, in accordance with a determination that the first object does not satisfy the one or more criteria, the electronic device forgoes generating the first event associated with formulating the first compilation.

In some examples, the one or more criteria include a criterion that is satisfied if, while visually detecting the first object in the physical environment, the electronic device detects gaze of the user directed to the first object for at least a threshold amount of time. In some examples, the one or more criteria include a criterion that is satisfied if, based on user data provided by one or more applications running on the electronic device, the user has previously expressed interest in the first object and/or an object similar to the first object. In some examples, the one or more criteria include a criterion that is satisfied if, based on image data associated with previously formulated compilations at the electronic device, the first object has been included in captured images fewer than a threshold amount of times. In some examples, generating the first event includes capturing, via the one or more cameras, one or more images of the first object. In some examples, generating the first event includes generating metadata associated with the first object, such as information identifying the first object, information identifying a location of the first object, and/or information identifying a statistic associated with the first object.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114b and 114c. While a single display 120 is shown, it should be appreciated that display 120 may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
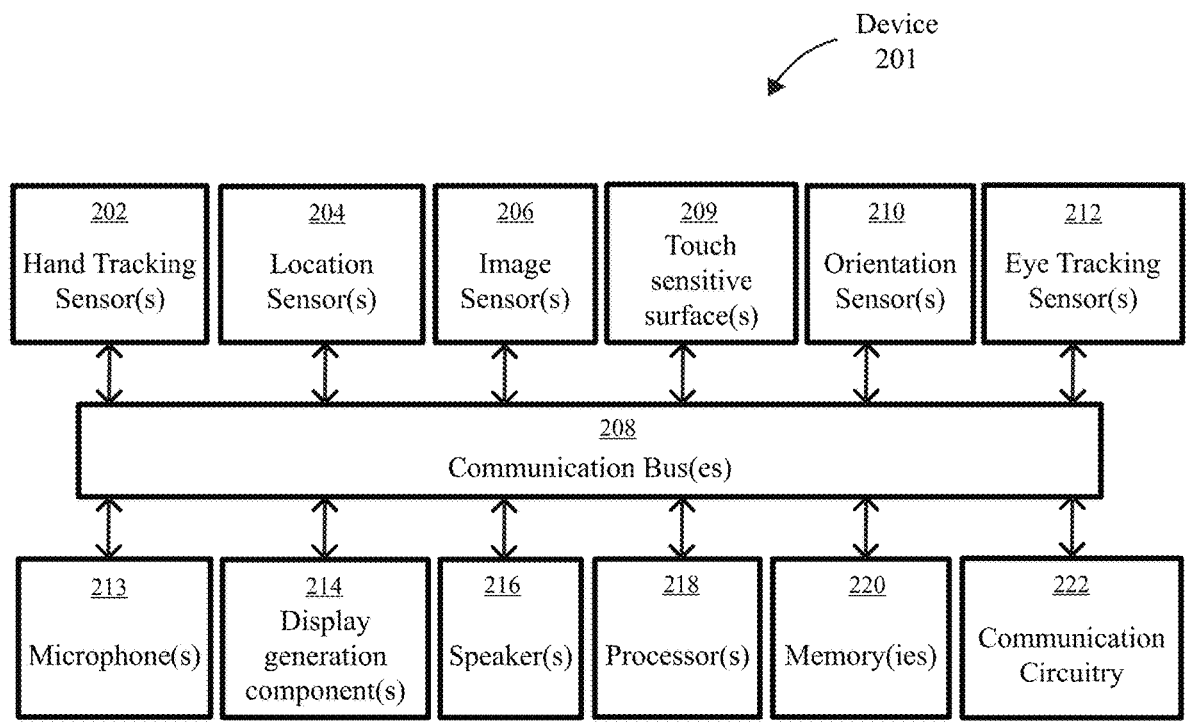
FIG. 2 illustrates a block diagram of an example architecture for a device according to some examples of the disclosure.

FIG. 2 illustrates a block diagram of an example architecture for a device 201 according to some examples of the disclosure. In some examples, device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed towards examples of an electronic device selectively capturing one or more images for formulation of a timelapse during an exercise activity of a user of the electronic device. In some examples, as discussed below, the electronic device captures one or more images of a physical environment in which the user is performing an exercise activity in accordance with detecting one or more objects of interest in the physical environment. In some examples, as discussed below, the electronic device displays one or more visual indications in a computer-generated environment that includes the physical environment in accordance with detecting one or more objects of interest in the physical environment.

FIGS. 3A-3K illustrate examples of an electronic device selectively capturing one or more images for formulation of a timelapse during an exercise activity according to some examples of the disclosure. The electronic device 301 may be similar to electronic devices 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3K, a user is optionally wearing the electronic device 301, such that three-dimensional environment 350 (e.g., a computer-generated environment) can be defined by X, Y and Z axes as viewed from a perspective of the electronic device (e.g., a viewpoint associated with the user of the electronic device 301). Accordingly, as used herein, the electronic device 301 is configured to be movable with six degrees of freedom based on the movement of the user (e.g., the head of the user), such that the electronic device 301 may be moved in the roll direction, the pitch direction, and/or the yaw direction.

Figure 3A:
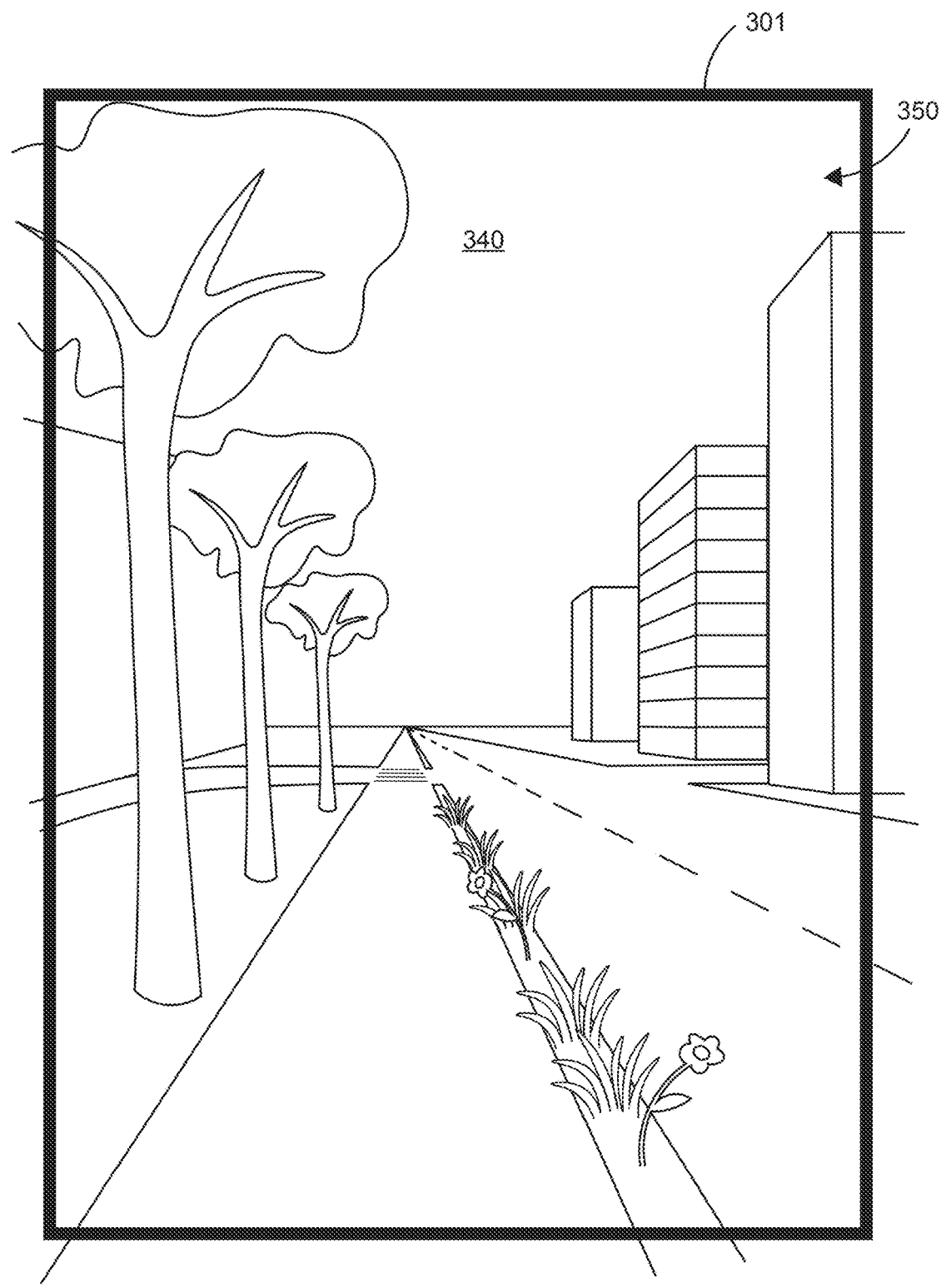
FIGS. 3A-3K illustrate examples of an electronic device selectively capturing one or more images for formulation of a timelapse during an exercise activity according to some examples of the disclosure.

As shown in FIG. 3A, the electronic device 301 may be positioned in a physical environment (e.g., an outdoors environment) that includes a plurality of real-world objects. For example, in FIG. 3A, the electronic device 301 may be positioned in a city environment or a physical environment 340 that includes a plurality of buildings, sidewalks, roads, greenery (e.g., flowers, grass, shrubbery, trees, plants, etc.), streetlamps, streetlights, and the like (e.g., the user of the electronic device 301 is standing or walking on a sidewalk in the physical city environment). Accordingly, in some examples, the three-dimensional environment 350 presented using the electronic device 301 optionally includes captured portions of the physical environment (e.g., the city environment 340) surrounding the electronic device 301, such as one or more representations of one or more buildings in the field of view of the three-dimensional environment 350. Additionally, as shown in FIG. 3A, the three-dimensional environment 350 may include representations of the sidewalks, roads, greenery, streetlamps, and/or streetlights of the city environment 340 in which the electronic device 301 is located. In some examples, the representations can include portions of the physical environment viewed through a transparent or translucent display of electronic device 301.

Figure 3B:
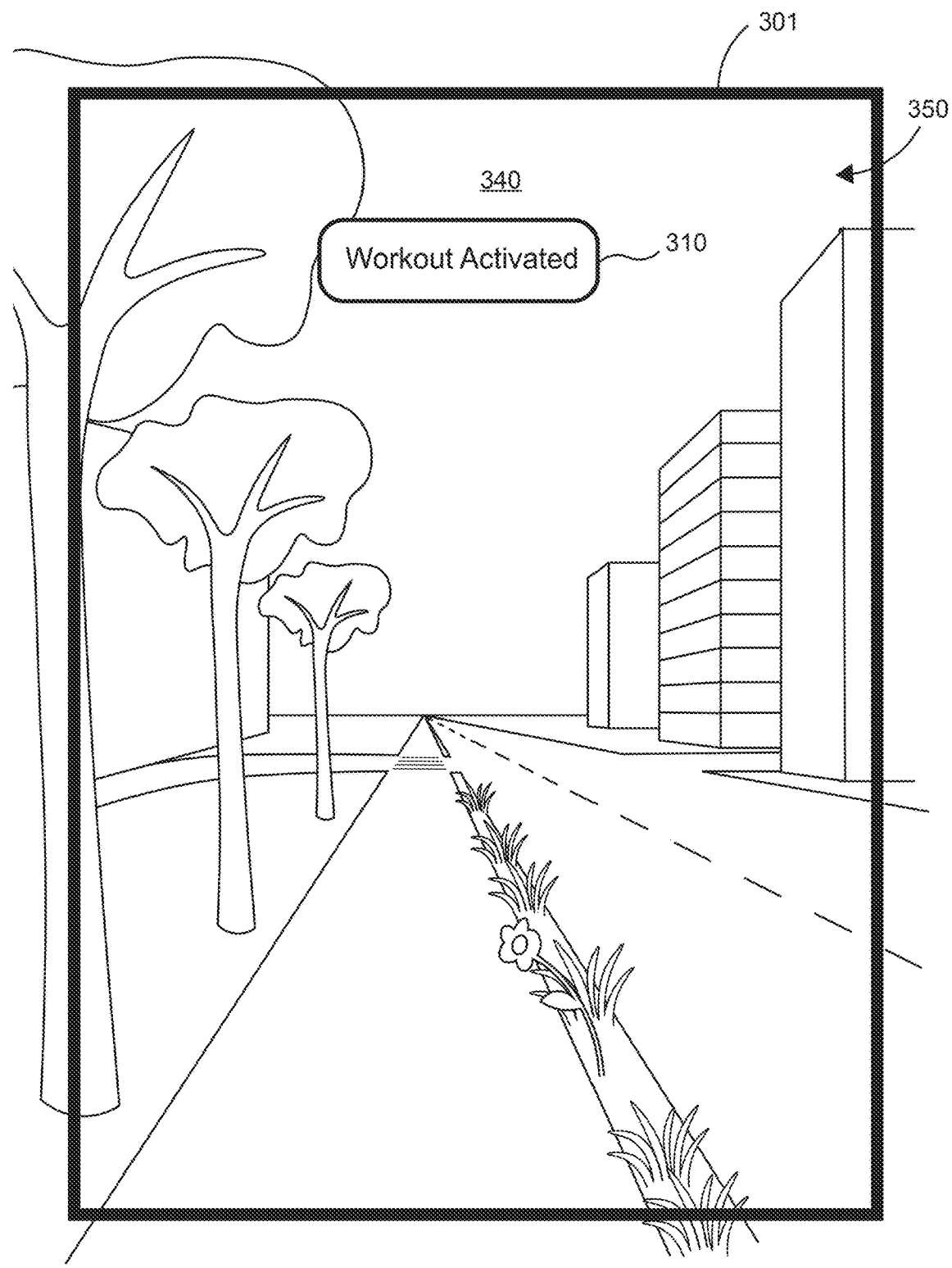

In FIG. 3B, the electronic device 301 detects initiation of an exercise activity associated with the user of the electronic device 301. For example, from FIGS. 3A to 3B, the electronic device 301 detects, via one or more sensors (e.g., such as the sensor(s) described with reference to FIG. 2A), movement of the electronic device 301 within the physical environment 340 caused by movement of the user of the electronic device 301. In some examples, the exercise activity corresponds to a walking activity, a running activity, a cycling activity, a lunging activity, among other possibilities, which produces movement of the electronic device 301 in the city environment 340. In some examples, detecting initiation of the exercise activity includes detecting user input via an exercise application operating on the electronic device 301. For example, the electronic device 301 detects user input for recording the exercise activity at the electronic device 301 (e.g., selection of a workout "start" option). In some examples, detecting initiation of the exercise activity includes detecting user input at a second electronic device, different from the electronic device 301. For example, the user provides user input directed to a mobile electronic device, such as a smartphone or smart watch associated with the user and in communication with the electronic device 301, such that the electronic device 301 determines that the exercise activity has been initiated.

In some examples, as shown in FIG. 3B, in response to detecting the initiation of the exercise activity, the electronic device 301 activates an exercise tracking mode of operation. In some examples, while the exercise tracking mode of operation is active, the electronic device 301 tracks (e.g., records) one or more fitness metrics associated with the exercise activity, as discussed in more detail below. In some examples, as shown in FIG. 3B, when the electronic device 301 activates the exercise tracking mode of operation, the electronic device 301 displays a visual indication 310 that the exercise tracking mode of operation has been activated (e.g., "Workout Activated") in the three-dimensional environment 350.

Figure 3C:
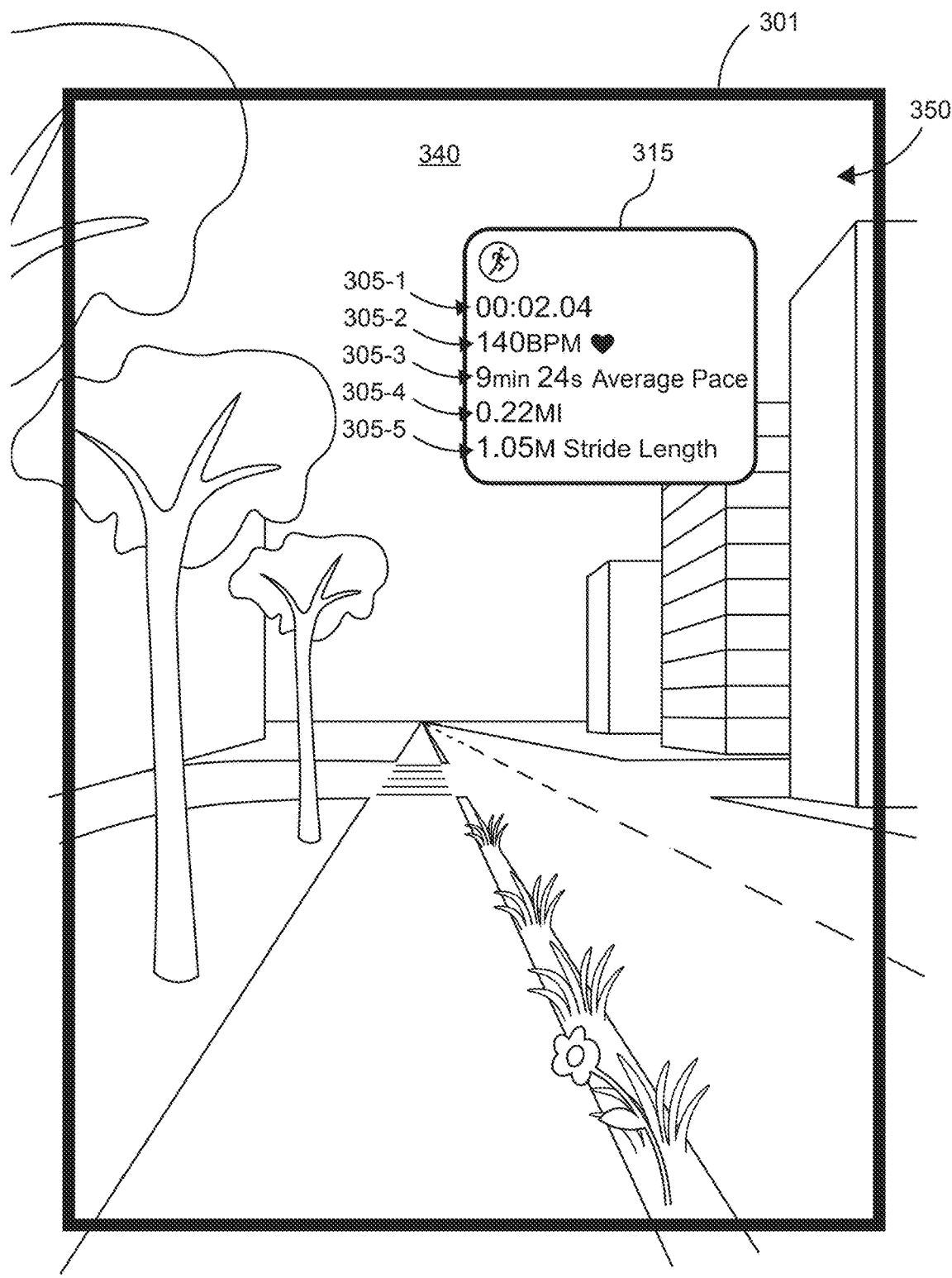

In some examples, as shown in FIG. 3C, while the exercise tracking mode of operation is active, the electronic device 301 displays a first user interface 315 associated with the exercise activity. In some examples, as shown in FIG. 3C, the first user interface 315 includes one or more representations of one or more fitness metrics associated with the exercise activity. For example, in FIG. 3C, the detected exercise activity is a running activity. Accordingly, as shown in FIG. 3C, the first user interface 315 includes a representation of a duration of the exercise activity (e.g., 2 minutes and 4 seconds) (305-1), a representation of a current determined heart rate of the user during the exercise activity (e.g., 141 beats per minute (BPM)) (305-2), a representation of an average running pace of the user during the exercise activity (e.g., 9 minutes and 24 seconds) (305-3), a representation of a distance associated with the exercise activity (e.g., 0.22 miles) (305-4), and a representation of a stride length of the user during the exercise activity (e.g., 1.05 meters) (305-5). In some examples, the electronic device 301 determines the one or more fitness metrics associated with the exercise activity based on detected vital signs of the user (e.g., heart rate) and/or the detected movement of the user. In some examples, the vital signs and/or the movement of the user are detected via one or more sensors integrated with the electronic device 301 and/or one or more sensors integrated with a second electronic device, such as a mobile electronic device, which is worn on a portion of the user (e.g., wrist or arm) and is in communication with the electronic device 301.

In some examples, if the electronic device 301 detects a conclusion (e.g., end or termination) in the movement of the electronic device 301, the electronic device 301 deactivates the exercise tracking mode of operation. For example, if the user ceases moving within the city environment 340, the electronic device 301 also ceases to move (e.g., and/or moves below a movement threshold (e.g., 0, 0.1, 0.5, 0.75, 1, 1.5, etc. m/s)) in the city environment 340. In some examples, the electronic device 301 pauses the exercise tracking mode of operation for a threshold amount of time (e.g., 30 seconds, 1, 2, 3, 5, 10, etc. minutes) before initiating conclusion of the exercise tracking mode of operation. For example, if the electronic device 301 detects that the threshold amount of time has elapsed since detecting the end of the movement of the electronic device 301, the electronic device 301 automatically deactivates the exercise tracking mode of operation or displays a visual indication in the three-dimensional environment 350 prompting the user to confirm that the exercise activity has ended. In some examples, deactivating the exercise tracking mode of operation includes ceasing display of the first user interface 315 in the three-dimensional environment 350.

In some examples, it may be desirable to formulate a timelapse (e.g., a compilation of images) corresponding to the detected exercise activity for later presentation to the user (e.g., as a slideshow, a video, a digital photo album, etc.) at the electronic device 301 or a different electronic device associated with the user. In some examples, the electronic device 301 formulates the timelapse by capturing, during the exercise activity (e.g., the running activity discussed above), one or more images of the city environment 340 in which the exercise activity is performed. Particularly, the electronic device 301 may identify one or more objects of interest (e.g., stationary and/or moving physical objects) in the field of view of the user, and in accordance with identifying the one or more objects of interest, may capture one or more images of the one or more objects of interest and store the captured one or more images for processing and formulation of the timelapse. In some examples, as discussed below, the electronic device 301 identifies a respective object of interest based on user interaction (e.g., gaze direction in the three-dimensional environment 350). In some examples, as discussed below, the electronic device 301 identifies a respective object of interest based on user data (e.g., user preferences data, user activity (e.g., watch history, browsing history, or other viewing history), or other application data). In some examples, as discussed below, the electronic device 301 identifies a respective object of interest based on data associated with previous timelapses (e.g., the particular objects of interest highlighted in previous images in previous timelapses). In some examples, the electronic device 301 selectively captures the one or more images for formulating the timelapse of the exercise activity automatically (e.g., in response to detecting the initiation of the exercise activity as discussed above). In some examples, the electronic device 301 selectively captures the one or more images for formulating the timelapse of the exercise activity based on one or more user-defined settings (e.g., enablement of the formulation of timelapses, enablement of the formulation of timelapses for particular user activities (e.g., exercise activities), and/or enablement of the formulation of timelapses periodically (e.g., during a particular time period, at particular locations, and/or based on device operation (e.g., battery level or power output)).

Figure 3D:
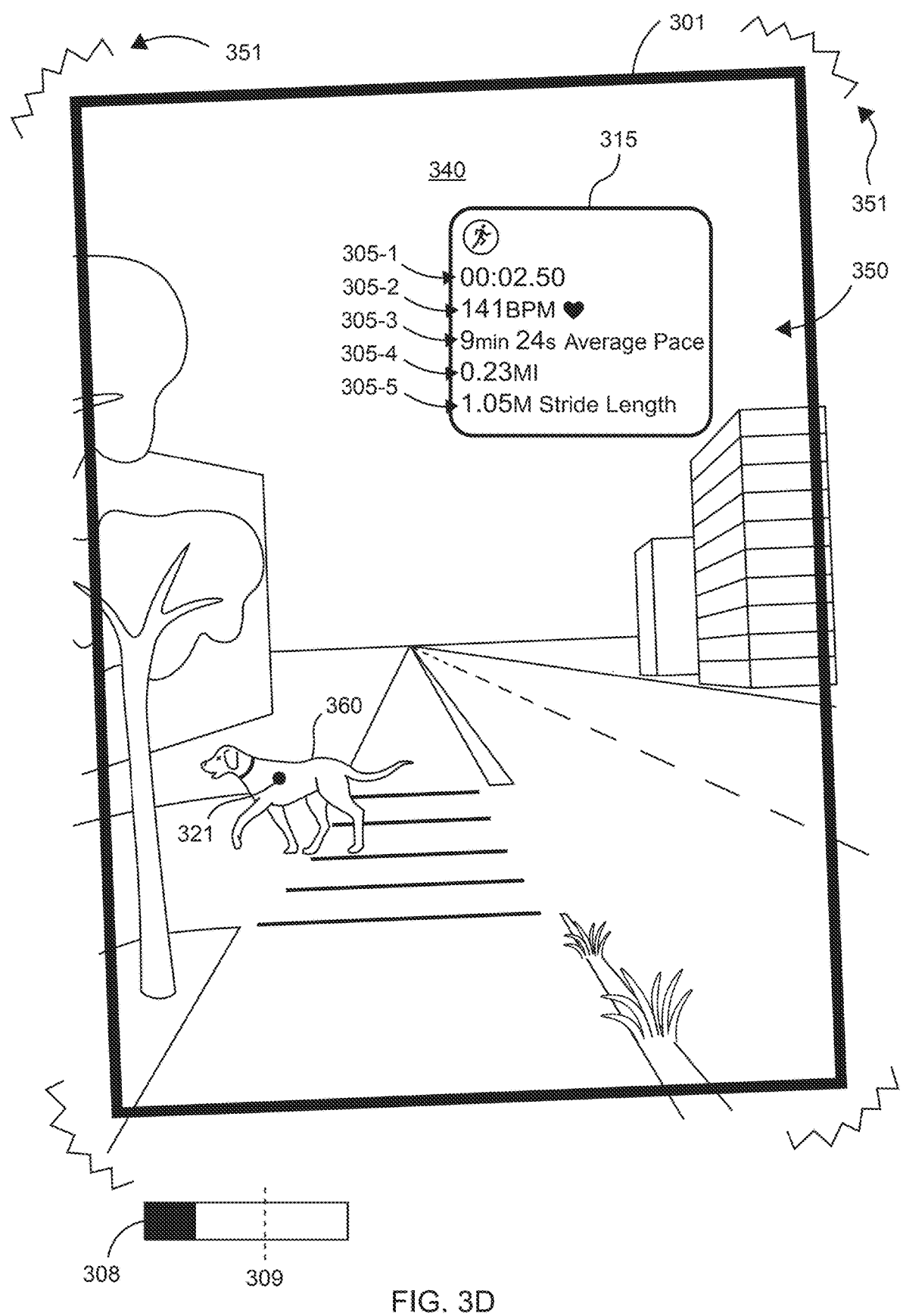

In FIG. 3D, while a timelapse formulation mode of operation is active (e.g., after detecting the initiation of the exercise activity above), the electronic device 301 visually detects (e.g., via one or more cameras of the electronic device 301) dog 360 in the city environment 340 in the field of view of the user. In some examples, in response to visually detecting the dog 360 in the city environment 340, the electronic device 301 determines whether the dog 360 corresponds to an object of interest that should be included in a timelapse of the user's current exercise activity (e.g., in one or more images captured by the electronic device 301). In some examples, the electronic device 301 determines that the dog 360 corresponds to an object of interest in accordance with a determination that one or more interest criteria are satisfied. In some examples, the one or more interest criteria include a criterion that is satisfied when the electronic device 301 detects gaze of the user is directed toward the dog 360 when the dog 360 is visually detected in the city environment 340. As shown in FIG. 3D, the electronic device 301 detects that gaze 321 of the user is directed toward the dog 360 in the city environment 340 while the dog 360 is in the field of view of the user. In some examples, the one or more interest criteria are satisfied if the electronic device 301 detects the gaze 321 directed to the dog 360 for a threshold amount of time (e.g., 0.5, 1, 1.5, 2, 3, 4, 5, etc. seconds), as represented by time 309 in time bar 308 in FIG. 3D. As mentioned above, in some examples, the electronic device 301 determines whether the dog 360 is an object of interest before capturing one or more images of the dog 360 or after capturing one or more images of the city environment 340, which include the dog 360. In either scenario, the electronic device 301 optionally uses the one or more images of the dog 360 in the formulation of the timelapse of the exercise activity based on whether the one or more interest criteria are satisfied.

In some examples, the electronic device 301 determines that the dog 360 is an object of interest based on user data provided by one or more applications running on the electronic device 301 (e.g., or a second electronic device in communication with the electronic device 301). For example, the electronic device 301 is configured to access a database, library, or other repository of user data provided by one or more applications with which the user interacts and/or which are associated with a user account of the user (e.g., in which the user is logged into on the electronic device 301). In some examples, the electronic device 301 determines whether the dog 360 is an object of interest based on whether the user data includes information indicative objects related to the dog 360 (e.g., objects of a same or similar type). For example, the electronic device 301 may access user data associated with a photos application running on the electronic device 301. In such an instance, if a photo library within the photos application includes a plurality of images (e.g., photographs, screenshots, videos, etc.) of objects similar to the dog 360, such as images of other dogs, images of other pets or animal life, and/or images of objects associated with dogs, such as leashes, collars, crates, beds, brushes, biscuits, treats, dog food, etc., the electronic device 301 determines that the dog 360 is an object of interest. As another example, the electronic device 301 may access user data associated with a web browsing application running on the electronic device 301. In such an instance, if user browsing history (and/or purchase history or other web-based user behavior) includes searches for dogs, pet stores, animal shelters, dogs for adoption, etc., and/or searches for items/objects associated with dogs, such as leashes, collars, crates, beds, brushes, biscuits, treats, dog food, etc., the electronic device 301 determines that the dog 360 is an object of interest. In some examples, the electronic device 301 is configured to access the user data provided by one or more applications running on the electronic device 301 in accordance with a determination that the electronic device 301 has been provided express access to the user data (e.g., by the user via one or more user settings associated with the formulation of timelapses).

In some examples, the electronic device 301 determines that the dog 360 is an object of interest based on image data associated with previously formulated timelapses at the electronic device 301 (e.g., or a second electronic device in communication with the electronic device 301). For example, as mentioned above, the electronic device 301 may formulate a timelapse for a given detected user activity, such as a detected exercise activity. In the example of FIG. 3D, the electronic device 301 has optionally formulated previous timelapses for previously detected exercise activities (e.g., previous running activities) at previous points in time (e.g., earlier in the day or earlier in the week or earlier in the month). In some examples, during the formulation of the prior timelapses, the electronic device 301, as discussed above, identified objects of interest for which to capture one or more images. In some examples, during one or more of the formulations of the prior timelapses, a dog (e.g., or similar animal) may have been identified as an object of interest and thus may have been included in one or more images used to formulate one or more of the prior timelapses. Accordingly, in some examples, the electronic device 301 determines whether the dog 360 is an object of interest based on a number of instances that dogs (or similar animals) were included as objects of interest in prior timelapses (e.g., to help avoid or reduce sameness and/or lack of variability in the objects of interest presented to the user via the timelapses). For example, if dogs (or similar animals) were included as objects of interest in (e.g., a predetermined number of) prior timelapses (e.g., and/or for a predetermined time period, such as the last week, month, three months, etc.) less than a threshold number of times, the electronic device 301 determines that the dog 360 is an object of interest for which to capture one or more images for the formulation of the timelapse of the current exercise activity of the user.

In some examples, in accordance with a determination that an object of interest has been detected, the electronic device 301 applies one or more image correction techniques to the capture of the one or more images of the object of interest (e.g., dog 360). In some examples, applying the one or more image correction techniques includes, if the electronic device 301 is moving, forgoing capture of an image of the object of interest until the movement of the electronic device 301 falls below and/or is below a movement threshold (e.g., while the object of interest is in the field of view of the user). For example, the electronic device 301 waits until the electronic device 301 is substantially still, such that an orientation of the electronic device 301 is within a threshold amount of being aligned to (e.g., 0, 1, 5, 10, 15, etc. degrees of) a horizon of the field of view of the user (e.g., a horizontal line across (e.g., a center of) the current field of view of the user). As an example, in FIG. 3D, if the electronic device 301 determines that the dog 360 is an object of interest (e.g., according to any one or more of the interest criteria and/or approaches discussed above), the electronic device 301 forgoes capturing an image (or images) of the dog 360 because the movement of the electronic device 301 (e.g., caused by the movement (e.g., running/walking) of the user), represented by movement 351 (e.g., jitter, shakiness, rotation, etc.), is above the movement threshold discussed above. Additional examples of image correction techniques that may be applied to the capture of images of objects of interest are provided below.

Figure 3E:
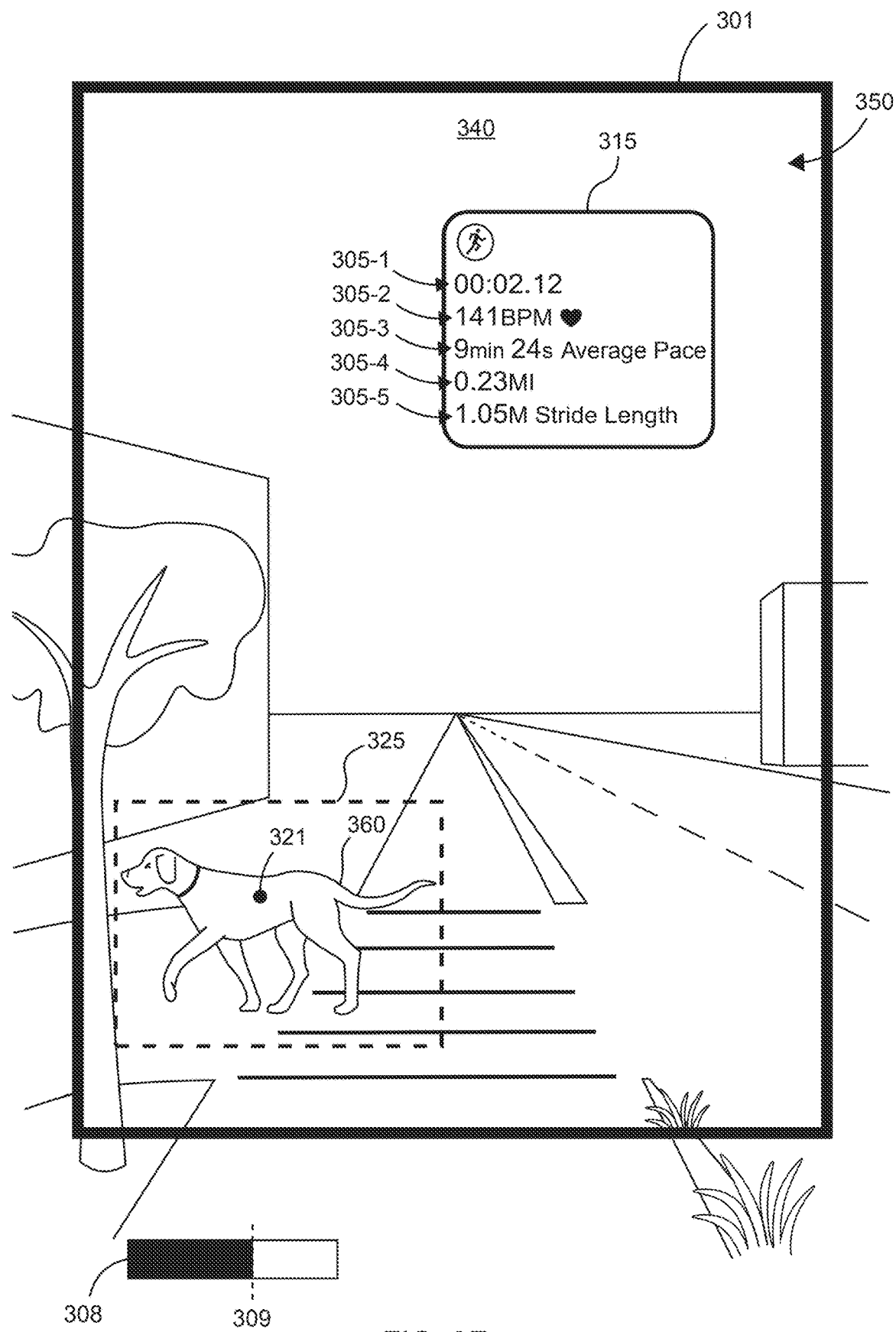

In FIG. 3E, the electronic device 301 determines that the dog 360 is an object of interest that is to be included in the timelapse of the user's current exercise activity. For example, the electronic device 301 determines that one or more of the one or more interest criteria discussed above are satisfied, such as the gaze 321 being directed toward the dog 360 for at least the threshold amount of time, indicated by time 309 in the time bar 308. As another example, the electronic device 301 determines that the dog 360 is an object of interest based on user data and/or based on image data associated with prior timelapses, as previously discussed above.

In some examples, when the electronic device 301 determines that the dog 360 is an object of interest, the electronic device 301 captures one or more images, represented by dashed rectangle 325, of the dog 360 for formulation of the timelapse of the user's current exercise activity, as shown in FIG. 3E. In some examples, as mentioned above, one example of an image correction technique that can be applied is forgoing capture of images of the dog 360 until the movement of the electronic device 301 is below the movement threshold discussed above. As shown in FIG. 3E, a shakiness and/or jitter in movement of the electronic device 301 is low enough such that the electronic device 301 is able to capture a clear, sharp image of the dog 360 in the three-dimensional environment 350.

In some examples, applying the image correction technique includes cropping the captured image of the dog 360 in the three-dimensional environment 350. For example, the captured image may correspond to the camera view of the electronic device 301, which is the same as the current field of view of the user in FIG. 3E. In such an instance, the electronic device 301 may crop the captured image to be centered on the dog 360, such that the captured image comprises a portion of the city environment 340 surrounding the dog 360 (e.g., a predetermined portion, such as 50%, 60%, 70%, 75%, etc.). In some examples, applying the image correction technique includes rotating the captured image of the dog 360 in the three-dimensional environment 350. For example, the captured image may include an off-axis (e.g., a horizontally and/or vertically deviant) view of the dog 360 relative to a rectangular coordinate system centered on the dog 360 in the image. In such an instance, the electronic device 301 may rotate the captured image (or a portion of the captured image centered on the dog 360) in a clockwise or counterclockwise direction, such that a horizontal axis through (e.g., a center of) the dog 360 is aligned to the horizontal axis of the rectangular coordinate system. Additionally or alternatively, in some examples, applying the image correction technique includes utilizing computer vision to determine a saliency map or other region of interest in the one or more captured images of the dog 360 to determine the portion and/or subset of the one or more images to be stored, as discussed below. It should be understood that other image correction and/or image processing techniques may be applied to the captured images described herein for the formulation of the timelapse associated with the detected exercise activity. In some examples, the one or more captured images of the dog 360 are stored in a memory of the electronic device 301 and/or digitally in an image library or other database associated with a respective application on the electronic device 301 for the formulation of the timelapse.

It should be understood that, throughout the examples discussed herein, the electronic device 301 updates the one or more fitness metrics associated with the exercise activity in accordance with a progression of the exercise activity. For example, in FIGS. 3D and 3E, in accordance with a progression of the running activity discussed above, the electronic device 301 updates one or more of the representations of the fitness metrics in the first user interface 315 in the three-dimensional environment 350. As shown in FIGS. 3D and 3E, the electronic device 301 optionally updates the representation 305-1 of the duration of the exercise activity in accordance with the progression of the exercise activity (e.g., increases the duration by 2 seconds from FIG. 3D to FIG. 3E) and/or updates the representation 305-2 of the distance associated with the exercise activity in accordance with the progression of the exercise activity (e.g., increases the total distance by 0.01 miles from FIG. 3C to FIG. 3D). In some examples, the representations of the fitness metrics are updated in the first user interface 315 in real time.

Figure 3F:
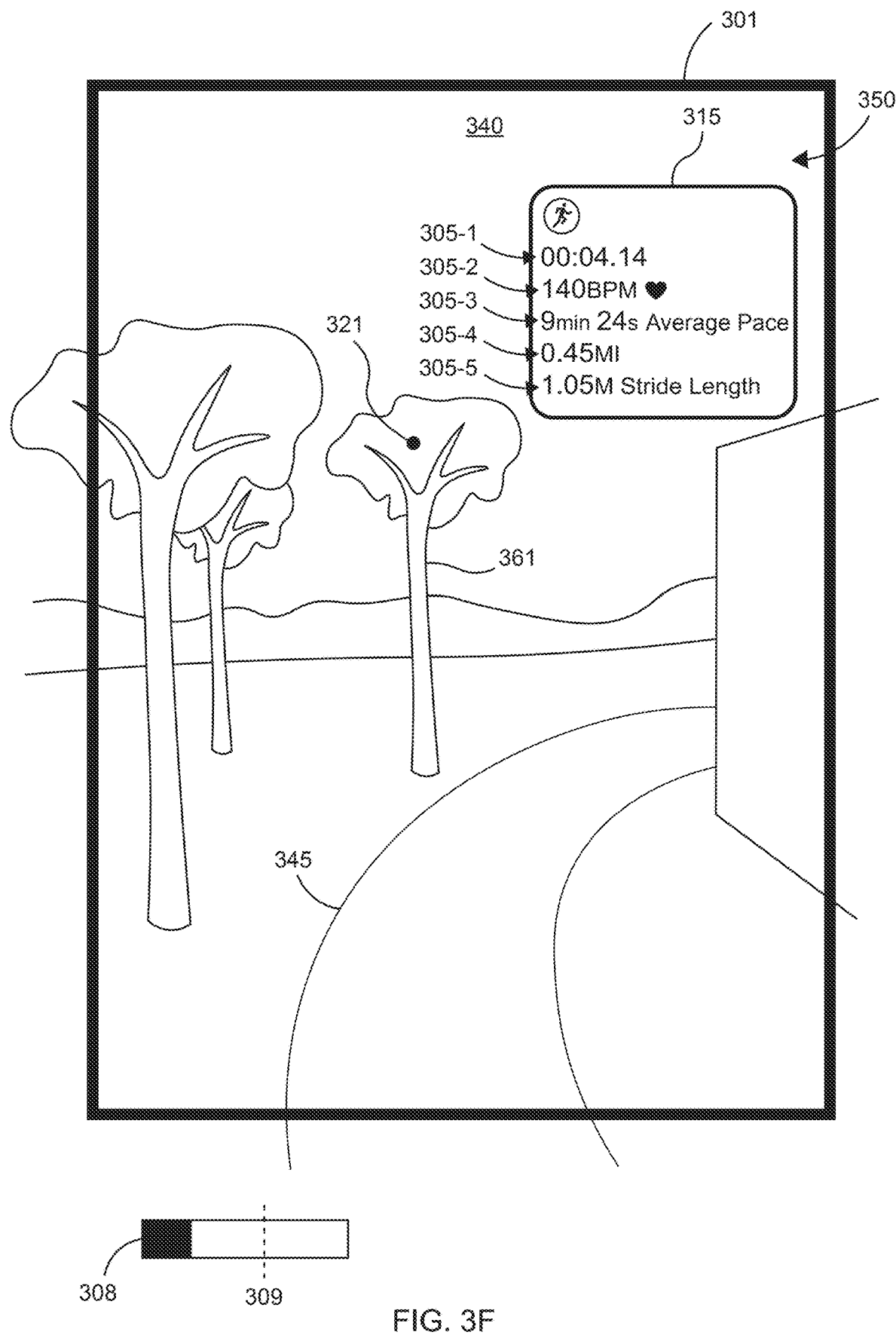

In FIG. 3F, the exercise activity of the user has progressed, as indicated by the representations 305-1 through 305-5 in the first user interface 315, such that the user is now running/walking along path 345 in the physical environment 340. In some examples, as shown in FIG. 3F, the three-dimensional environment 350 now includes tree 361 that is included in the portion of the physical environment 340 that is visible in the three-dimensional environment 350. As shown in FIG. 3F, the electronic device 301 optionally detects the gaze 321 of the user directed toward the tree 361 in the three-dimensional environment 350. Accordingly, the electronic device 301 determines whether the tree 361 corresponds to an object of interest that should be included in the timelapse of the exercise activity of the user.

As mentioned previously above, the electronic device 301 determines whether the tree 361 satisfies the one or more interest criteria to determine whether the tree 361 is an object of interest. In the example of FIG. 3F, the electronic device 301 detects the gaze 321 directed to the tree 361 for less than the threshold amount of time, as indicated by time 309 in time bar 308. Accordingly, in the example of FIG. 3F, the electronic device 301 forgoes capturing one or more images of the tree 361 for the formulation of the timelapse of the user's current exercise activity.

Figure 3G:
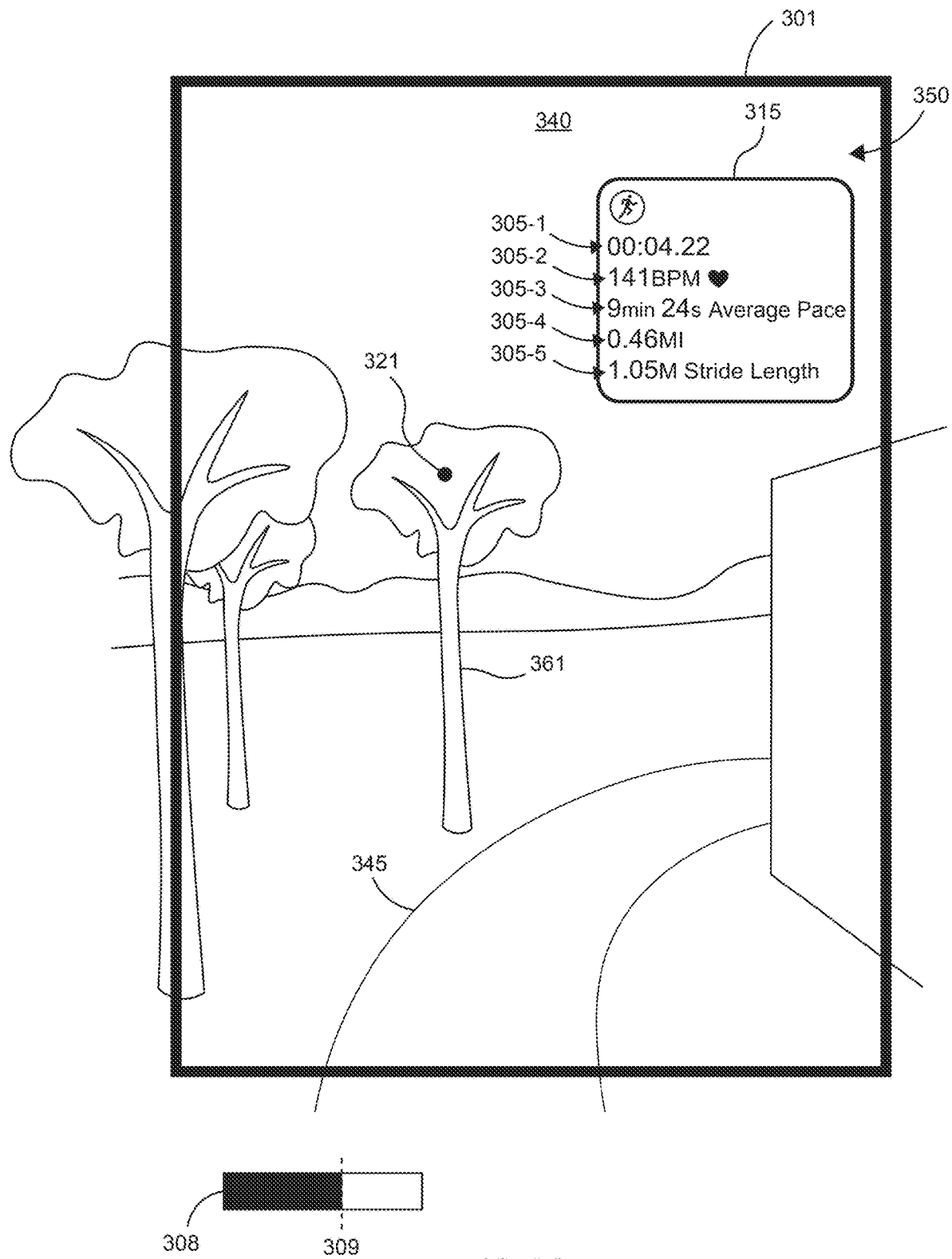

In FIG. 3G, while the electronic device 301 continues to visually detect (e.g., via the one or more cameras) the tree 361 in the three-dimensional environment 350 in the current field of view of the user, the electronic device 301 determines that the gaze 321 has been directed toward the tree 361 for at least the threshold amount of time, as indicated by time 309 in the time bar 308. However, as indicated in FIG. 3G, the electronic device 301 optionally forgoes capturing one or more images of the tree 361. For example, the electronic device 301 determines that the tree 361 is not an object of interest that should be included in the timelapse (e.g., despite the user's attention being focused on the tree 361 for at least the threshold amount of time).

In some examples, the electronic device 301 determines that the tree 361 is not an object of interest for the user based on user data provided by one or more applications running on the electronic device 301, as similarly discussed above. For example, the electronic device 301 determines that the photo library of the user's photos application does not include any images of trees or similar objects (e.g., forests, national parks, plant life, etc.), and/or includes fewer than a threshold number of trees (e.g., 10, 15, 20, etc. trees). As another example, the electronic device 301 determines that the user's browsing history does not include searches for trees or similar objects (e.g., forests, national parks, plant life, etc.). In some examples, the electronic device 301 determines that the tree 361 is not an object of interest for the user based on image data associated with previously formulated timelapses (e.g., for previous exercise activities) at the electronic device 301. For example, the electronic device 301 determines that the tree 361 has previously been included in a timelapse for a previous exercise activity (e.g., a previous running activity in the physical environment 340). As another example, the electronic device 301 determines that trees (or related plant life) have been highlighted as objects of interest in previous timelapses formulated for the user greater than a threshold number of times, as similarly discussed previously above. Accordingly, because the electronic device 301 determines, based on the user data and/or image data described above, that the tree 361 is not an object of interest for the user, the electronic device 301 forgoes capturing one or more images of the tree 361 for the formulation of the timelapse of the user's exercise activity.

Figure 3H:
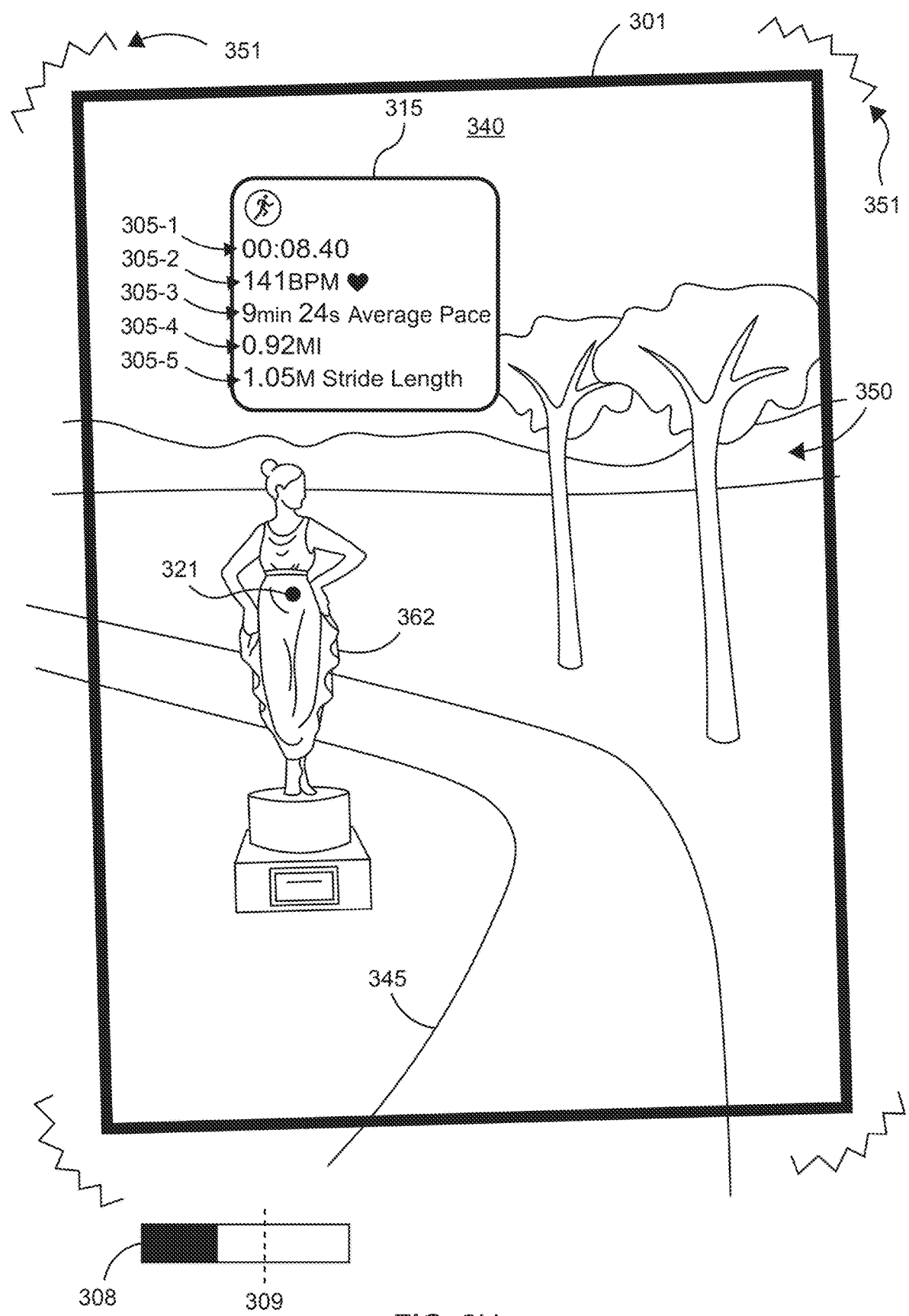

In FIG. 3H, the exercise activity of the user has progressed, as indicated by the representations 305-1 through 305-5 in the first user interface 315, such that the user has run/walked further along the path 345 in the physical environment 340. In some examples, as shown in FIG. 3H, the electronic device 301 visually detects (e.g., via one or more cameras of the electronic device 301) statue 362 in the portion of the physical environment 340 that is visible in the three-dimensional environment 350. In some examples, as similarly discussed above, when the electronic device 301 visually detects the statue 362, the electronic device 301 determines whether the statue 362 is an object of interest for the user.

In some examples, as shown in FIG. 3H, the electronic device 301 detects that the gaze 321 is directed to the statue 362 while the statue 362 is in the field of view of the user in the three-dimensional environment 350. In some examples, as similarly discussed above, the electronic device 301 determines that the gaze 321 has been directed to the statue 362 for less than the threshold amount of time, as indicated by time 309 in time bar 308 in FIG. 3H. Accordingly, the electronic device 301 determines, in FIG. 3H, that the one or more interest criteria discussed previously above are not satisfied (e.g., not yet satisfied).

Figure 3I:
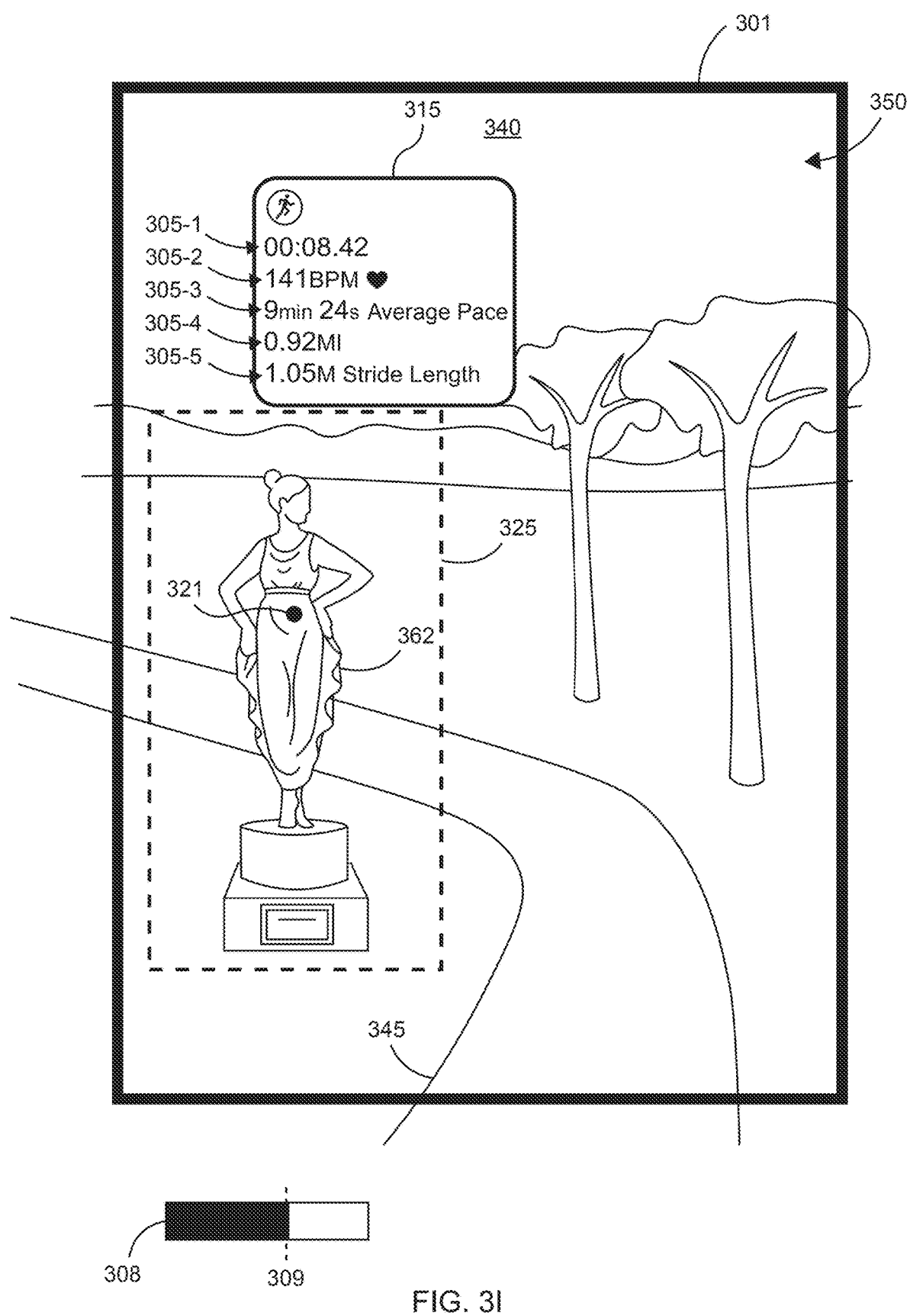

In FIG. 3I, while the statue 362 remains in the current field of view of the user in the three-dimensional environment 350, the electronic device 301 determines that the statue 362 is an object of interest for the user. Particularly, in some examples, the electronic device 301 determines that the one or more interest criteria discussed herein are satisfied. For example, as shown in FIG. 3I, the electronic device 301 detects the gaze 321 has been directed toward the statue 362 for at least the threshold amount of time, as indicated by time 309 in the time bar 308. Additionally or alternatively, in some examples, the electronic device 301 determines that the statue 362 is an object of interest for the user based on user data (e.g., images of statues present in the user's photo library and/or previous searches for art, including statues, present in the user's browsing history) and/or based on image data associated with previously formulated timelapses, as similarly discussed above.

In FIG. 3I, when the electronic device 301 determines that the statue 362 is an object of interest, the electronic device 301 captures one or more images of the statue 362, as indicated by rectangle 325, as similarly discussed above. For example, the electronic device 301 captures one or more images centered on the statue 362 (e.g., a predetermined region around the statue 362) and/or one or more images of the camera view (e.g., corresponding to the current field of view in FIG. 3I). In some examples, the electronic device 301 applies one or more image correction techniques when capturing the one or more images, as similarly discussed above. For example, the electronic device 301 rotates, crops, sharpens, and/or applies other processing techniques to the captured image(s). In other examples, the electronic device 301 captures one or more images of the statue 362 when movement 351 of the electronic device 301 (e.g., shakiness or jitter), in FIG. 3H, falls below the movement threshold discussed previously above, as shown in FIG. 3I. As discussed above, the electronic device 301 optionally utilizes the one or more captured images of the statue 362 to formulate the timelapse of the user's exercise activity.

In some examples, formulating the timelapse of the user's exercise activity includes storing information associated with the exercise activity, in addition to capturing images during the exercise activity in the manner discussed above. For example, the electronic device 301 stores location information (e.g., a current location of the electronic device 301) associated with the exercise activity, such as the place, scene, and/or business at which the user is performing the exercise activity (e.g., park, track, gym, beach, etc.). In some examples, the electronic device 301 stores time-related information associated with the exercise activity. For example, the electronic device 301 stores the date (e.g., day, month, and/or year) on which the exercise activity is performed and/or a time during which the exercise activity is performed (e.g., start time and/or end time). In some examples, the electronic device 301 stores information related to the one or more fitness metrics associated with the exercise activity, such as the fitness metrics represented in the first user interface 315 in the three-dimensional environment 350. For example, the electronic device 301 stores a summary of the exercise activity, which includes final values for the one or more fitness metrics, and/or any achievements or records of the user during the exercise activity, as discussed in more detail below. In some examples, the electronic device 301 generates and stores information corresponding to the objects of interest present in the captured images discussed above. For example, the electronic device 301 generates statistics corresponding to a particular object of interest and/or identifies the object of interest, as discussed in more detail below. In some examples, the electronic device 301 utilizes the stored information discussed above to generate labels or other visual indications to be transposed over the captured images in the timelapse, as discussed in more detail herein later.

Figure 3J:
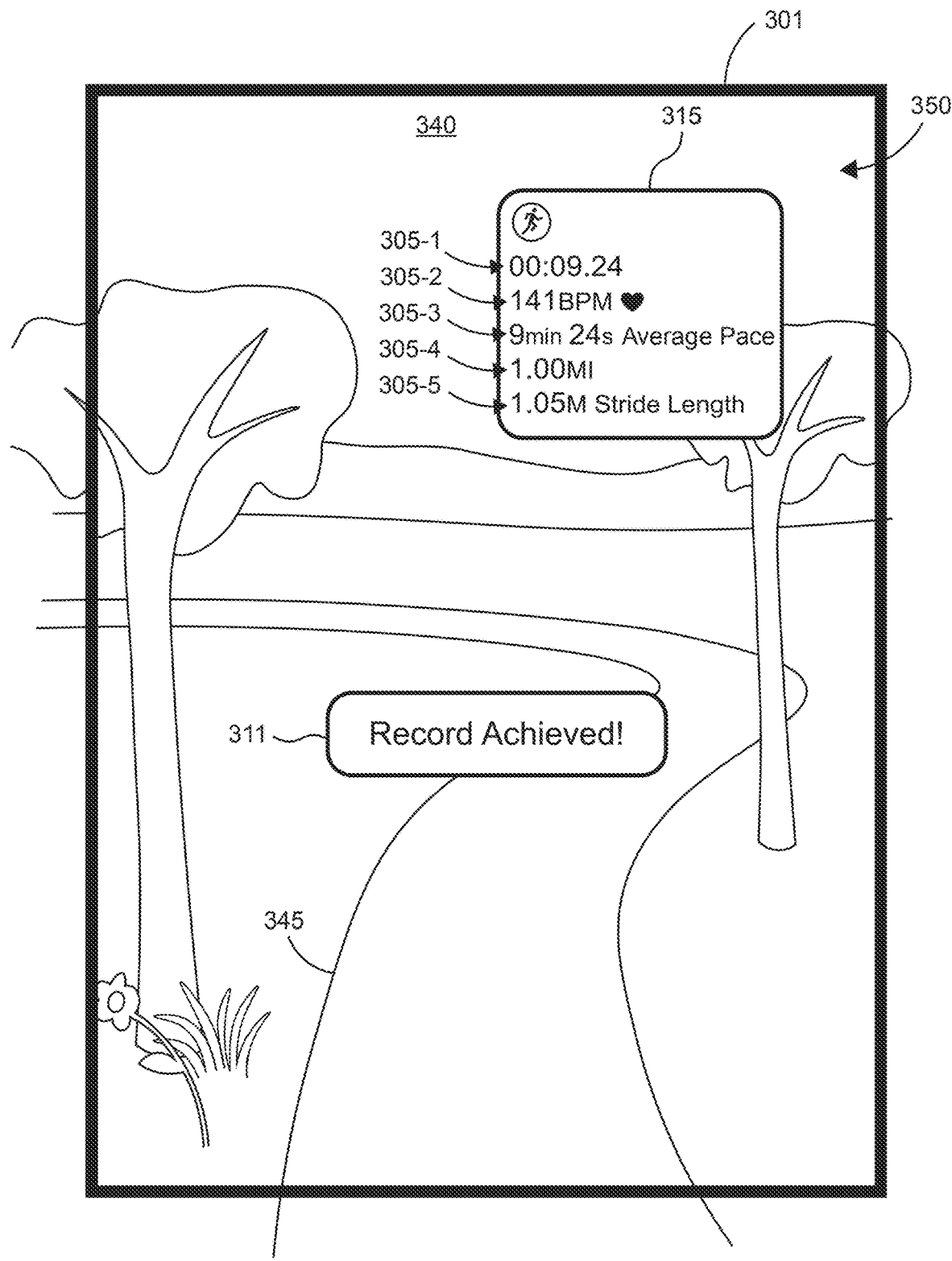

In some examples, the electronic device 301 presents, in the three-dimensional environment 350, a visual indication of the information stored by the electronic device 301 for the formulation of the timelapse of the user's exercise activity. For example, in FIG. 3J, the electronic device 301 determines that the user has achieved a record during the exercise activity (e.g., the user sets a record for running a mile). In some examples, the electronic device 301 stores information associated with the record for formulation of the timelapse of the exercise activity, as similarly discussed above. In some examples, the determination that the user has achieved a record causes the electronic device 301 to capture and store one or more images of the user's current field of view (e.g., corresponding to a camera frame of the electronic device 301 when the user's goal was achieved) for formulation of the timelapse of the exercise activity. Additionally, in some examples, the electronic device 301 displays indication 311 in the three-dimensional environment 350 indicating that the user has achieved the record, as shown in FIG. 3J.

Figure 3K:
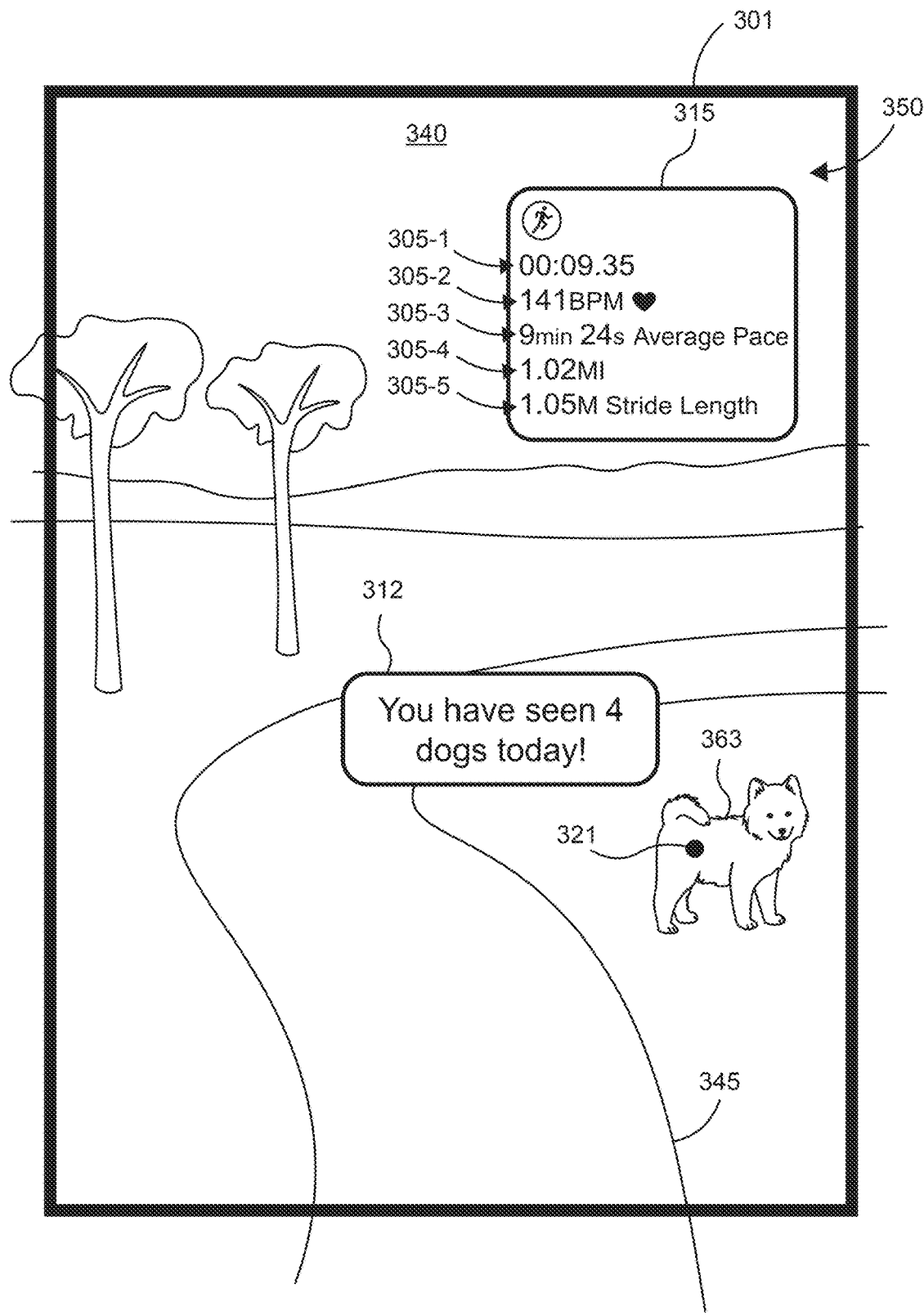

As another example, in FIG. 3K, the electronic device 301 visually detects an object of interest in the field of view of the user in the three-dimensional environment 350. For example, as shown in FIG. 3K, the electronic device 301 detects the gaze 321 of the user directed to dog 363 in the physical environment 440 (e.g., for the threshold amount of time discussed above) and determines that the dog 363 is an object of interest for the user (e.g., according to any one or combination of factors discussed herein above). Accordingly, as discussed above, the electronic device 301 captures one or more images of the dog 363 for the formulation of the timelapse of the user's exercise activity. In some examples, as shown in FIG. 3K, when the electronic device 301 captures the one or more images of the dog 363, the electronic device 301 displays visual indication 312 in the three-dimensional environment 350 indicating that the dog 363 is one of the objects of interest detected during the user's exercise activity. For example, as shown in FIG. 3K, the visual indication 312 provides a statistic associated with the object of interest, namely that the dog 363 is one of four dogs that have been detected by the electronic device 301 and noticed by the user (e.g., determined based on the gaze 321) during the user's exercise activity. In some examples, the statistic indicated by the visual indication 312 is also stored by the electronic device 301 for the formulation of the timelapse of the user's exercise activity.

In some examples, the electronic device 301 continues to capture images of detected objects of interest in the manners described above for the duration of the exercise activity. In some examples, when the electronic device 301 detects a conclusion of the exercise activity (e.g., detects that the electronic device 301 is no longer in motion (e.g., for more than a threshold amount of time, such as 1, 2, 3, 5, etc. minutes) or detects an input provided by the user indicating that the exercise activity is over), the electronic device 301 ceases formulation of the timelapse of the exercise activity. For example, the electronic device 301 ceases capturing images and/or generating and storing information associated with the exercise activity based on detection of objects of interest in the field of view of the user in the three-dimensional environment 350.

Attention is now directed to examples of an electronic device displaying one or more timelapses formulated based on detection of one or more exercise activities of the user, such as the exercise activity illustrated in FIGS. 3A-3K. In some examples, as discussed below, a formulated timelapse is accessible to the user via a respective application running on the electronic device. In some examples, a notification or other alert (e.g., a user "memories" alert) is provided to the user indicating that a timelapse has been formulated and is available for user consumption at the electronic device. In some examples, the notification is selectable to initiate playback of the timelapse at the electronic device.

Figure 4A:
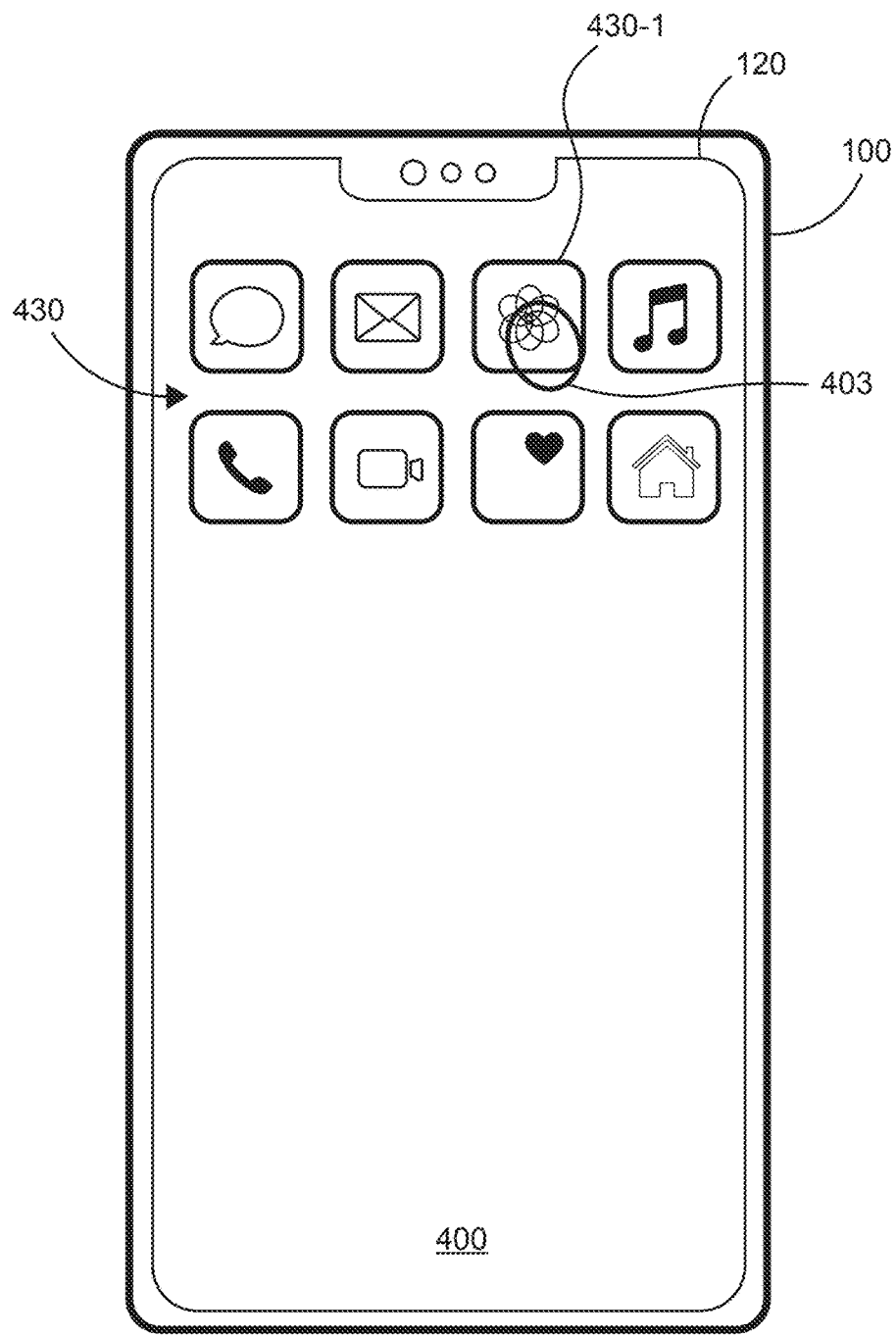
FIGS. 4A-4K illustrate examples of an electronic device displaying one or more timelapses associated with one or more exercise activities of a user of the electronic device according to some examples of the disclosure.

FIGS. 4A-4K illustrate examples of an electronic device displaying one or more timelapses associated with one or more exercise activities of a user of the electronic device according to some examples of the disclosure. The electronic device 100 may be similar to device 201 discussed above, and/or may be a mobile device, such as a smartphone, a tablet, or a laptop, or a desktop computer. In some examples, the electronic device 100 includes one or more components similar to electronic device 201 in FIG. 2, such as one or more touch-sensitive surfaces, one or more microphones or other audio sensors, one or more display generation components, one or more speakers, one or more processors, one or more memories, and/or communication circuitry. For example, as shown in FIG. 4A, the electronic device 100 includes touchscreen 120 that is configured to display one or more user interfaces and detect touch-based input.

In FIG. 4A, the electronic device 100 is optionally displaying home screen user interface 400 on the touchscreen 120. In some examples, as shown in FIG. 4A, the home screen user interface 400 includes a plurality of selectable icons 430 associated with a plurality of applications configured to be run on the electronic device 100. For example, selection of a respective icon of the plurality of icons 430 causes the electronic device 100 to display a user interface corresponding to a respective application. In FIG. 4A, while the electronic device 100 is displaying the home screen user interface 400, the electronic device 100 detects a selection of a first icon 430-1 of the plurality of icons 430. For example, as shown in FIG. 4A, the electronic device 100 detects a tap of contact 403 (e.g., a finger or stylus) directed to the first icon 430-1 on the touchscreen 120.

Figure 4B:
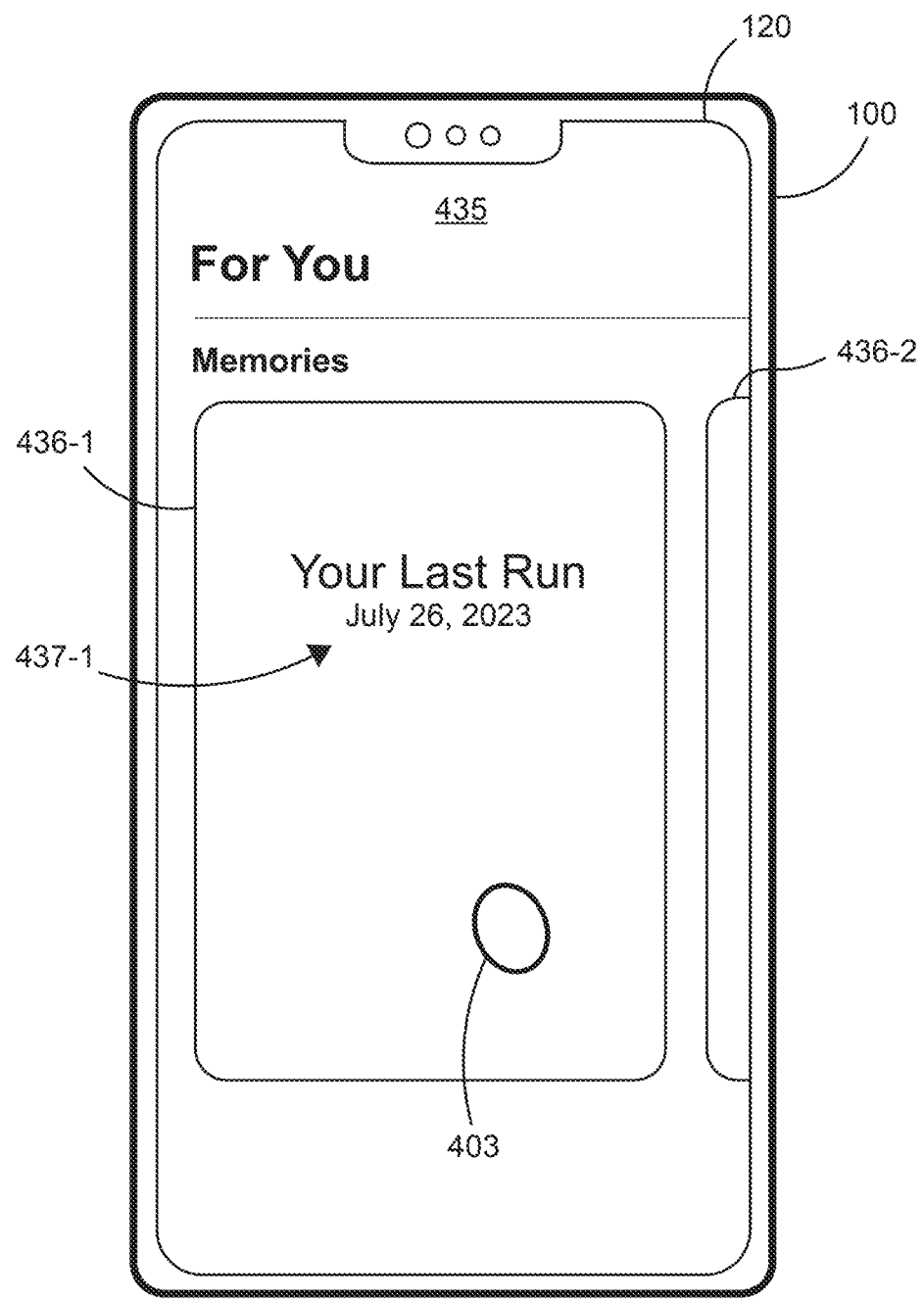

In some examples, as shown in FIG. 4B, in response to detecting the selection of the first icon 430-1, the electronic device 100 displays user interface 435 on the touchscreen 120. In some examples, the user interface 435 is associated with a photos application on the electronic device 100. Particularly, as shown in FIG. 4B, the user interface 435 is associated with user "memories" that are provided in the form of timelapses. In some examples, as shown in FIG. 4B, the user interface 435 includes an indication 436-1 of a first timelapse and an indication 436-2 of a second timelapse. In some examples, the user interface 435 is scrollable (e.g., horizontally) to cause the electronic device 100 to display additional indications of additional timelapses available to the user. In some examples, a respective indication of a respective timelapse is selectable to initiate playback (e.g., presentation) of the respective timelapse on the electronic device 100. In some examples, as shown in FIG. 4B, the indication 436-1 includes information 437-1 corresponding to the first timelapse. For example, as shown in FIG. 4B, the information 437-1 includes a title of the first timelapse (e.g., "Your Last Run") and/or an indication of a time and/or date of the first timelapse (e.g., "Jul. 26, 2023," which corresponds to the day Your Last Run occurred).

In FIG. 4B, the electronic device 100 detects an input corresponding to selection of the indication 436-1 of the first timelapse. For example, as shown in FIG. 4B, the electronic device 100 detects a tap of contact 403 (e.g., a finger, stylus, or other input device) on the touchscreen 120 directed to the indication 436-1.

Figure 4C:
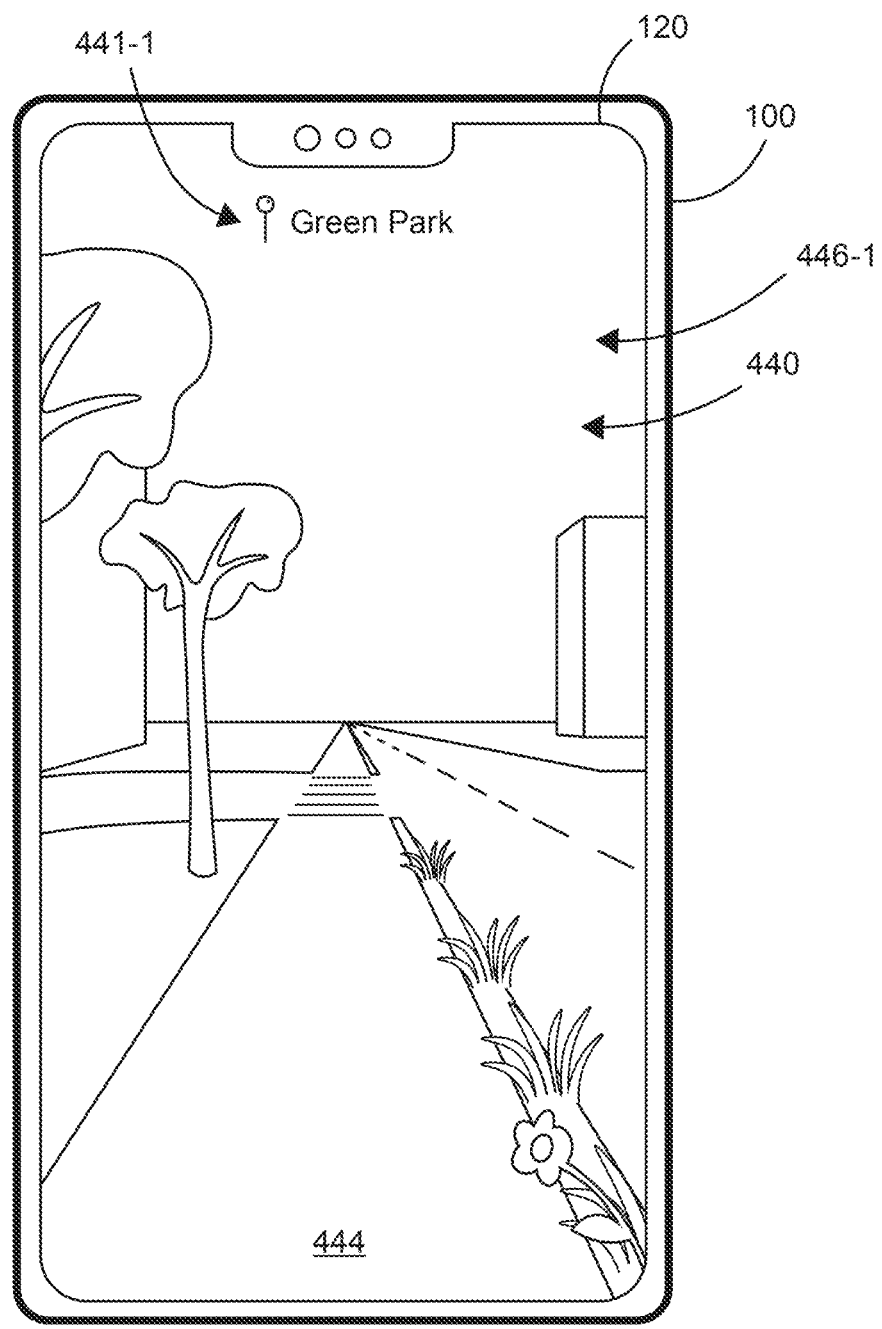

In some examples, as shown in FIG. 4C, in response to detecting the input selecting the indication 436-1, the electronic device 100 initiates presentation of the first timelapse. For example, as shown in FIG. 4C, the electronic device 100 displays user interface 444 corresponding to the first timelapse. As mentioned previously above, presenting the first timelapse optionally includes displaying a sequence of images (e.g., as a slideshow and/or a video) captured during the exercise activity discussed above with reference to FIGS. 3A-3K. In some examples, as shown in FIG. 4C, displaying the user interface 444 includes displaying a first image 446-1 (e.g., a first slide in the slideshow) on the touchscreen 120. In some examples, the presentation of the first timelapse is accompanied by audio (e.g., music, audio recordings from the exercise activity, or other audio). In some examples, as shown in FIG. 4C, the first image 446-1 corresponds to an image captured when the electronic device 301 detected the initiation of the exercise activity in FIG. 3B. Accordingly, as shown in FIG. 4C, the first image 446-1 includes physical environment 440 corresponding to physical environment 340 discussed above with reference to FIG. 3B in which the user performs the exercise activity.

In some examples, a length of the first timelapse (e.g., a length of the timelapse video and/or slideshow) is based on a number of images included in the first timelapse. For example, the first timelapse includes a respective number of images captured during the exercise activity discussed previously above and each image (e.g., such as the first image 446-1) is presented in the user interface 444 for a predetermined amount of time (e.g., 5 seconds, 10 seconds, 30 seconds, etc.) before transitioning to displaying a subsequent image of the first timelapse. Accordingly, in some examples, the length of the first timelapse is also based on the number of objects of interest detected during the exercise activity (e.g., because each captured image of the first timelapse highlights one or more objects of interest present in a given camera view (e.g., corresponding to the user's field of view) at a given time). In some examples, the length of the first timelapse is based on a length of the exercise activity discussed above. For example, the first timelapse may include video clips recorded from the exercise activity in addition to individual images captured during the exercise activity.

In some examples, presenting the first timelapse includes displaying one or more visual indications overlaid on the images included in the user interface 444. For example, as shown in FIG. 4C, the first image 446-1 is displayed with visual indication 441-1. In some examples, as shown in FIG. 4C, the visual indication 441-1 provides an indication of a location (e.g., Green Park) in which the exercise activity discussed above was performed.

Figure 4D:
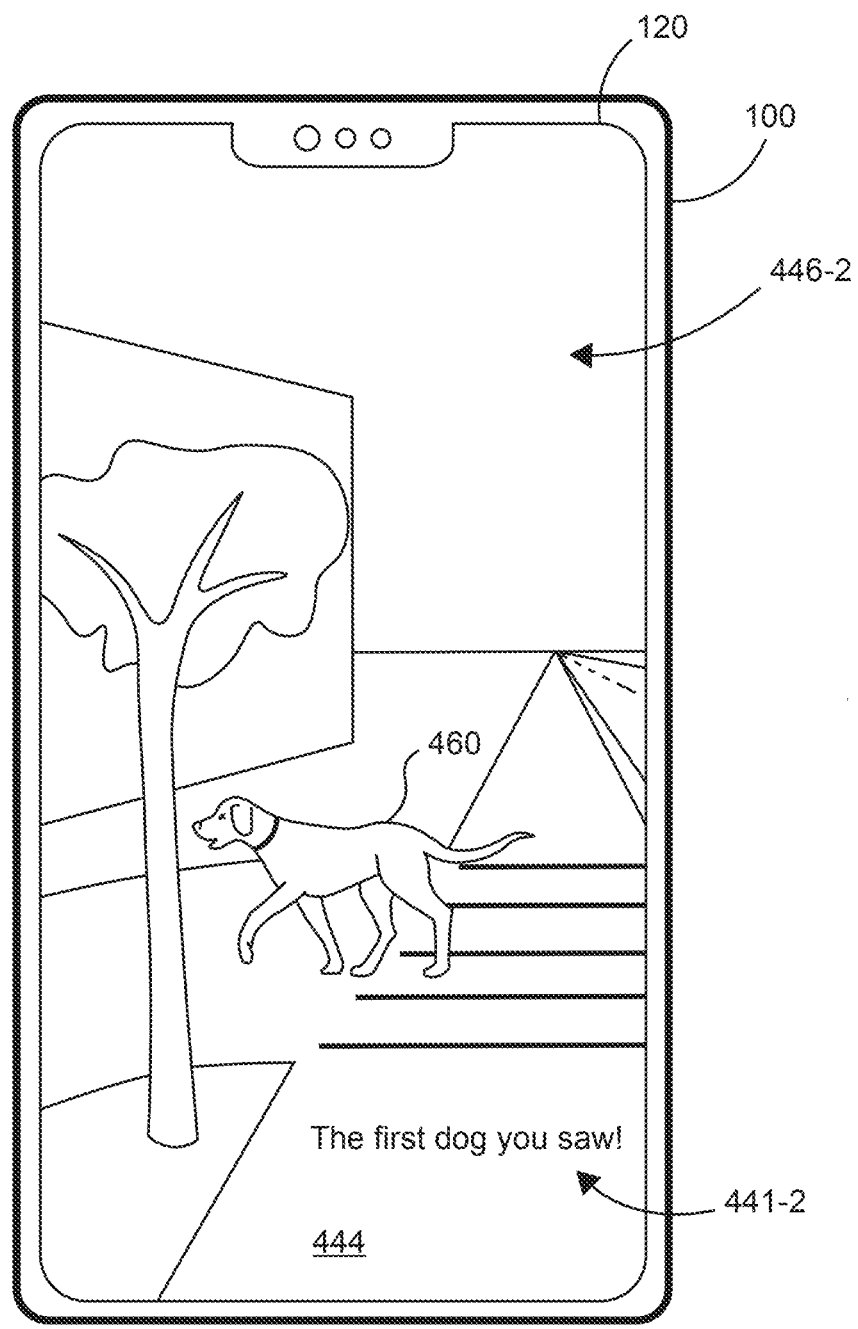

From FIGS. 4C to 4D, the electronic device 100 updates the user interface 444 to include a second image 446-2. For example, the electronic device 100 transitions (e.g., with an animation or other visual effect, such as a gradient effect or sweeping effect) from displaying the first image 446-1 to displaying the second image 446-2. In some examples, as shown in FIG. 4D, the second image 446-2 includes an object of interest detected during the exercise activity described previously above. For example, as shown in FIG. 4D, the second image 446-2 includes dog 460 corresponding to dog 360 in FIGS. 3D-3E. As described previously above with reference to FIG. 3E, the electronic device 301 captures one or more images of the dog 360, represented by rectangle 325, which has been included in the first timelapse in the second image 446-2. In some examples, as discussed previously above, the second image 446-2 is a digitally processed image of the dog 360 in FIG. 3E. For example, the originally captured image(s) of the dog 360 have been cropped, rotated, sharpened, etc. to produce the second image 446-2 in FIG. 4D.

In some examples, as similarly discussed above, displaying the second image 446-2 includes displaying visual indication 441-2 in the user interface 444. For example, as shown in FIG. 4D, the visual indication 441-2 is overlaid on the second image 446-2. In some examples, the visual indication 441-2 provides a statistic related to the dog 360 in FIG. 3E (e.g., the dog 360 was the first dog the user saw during the exercise activity).

Figure 4E:
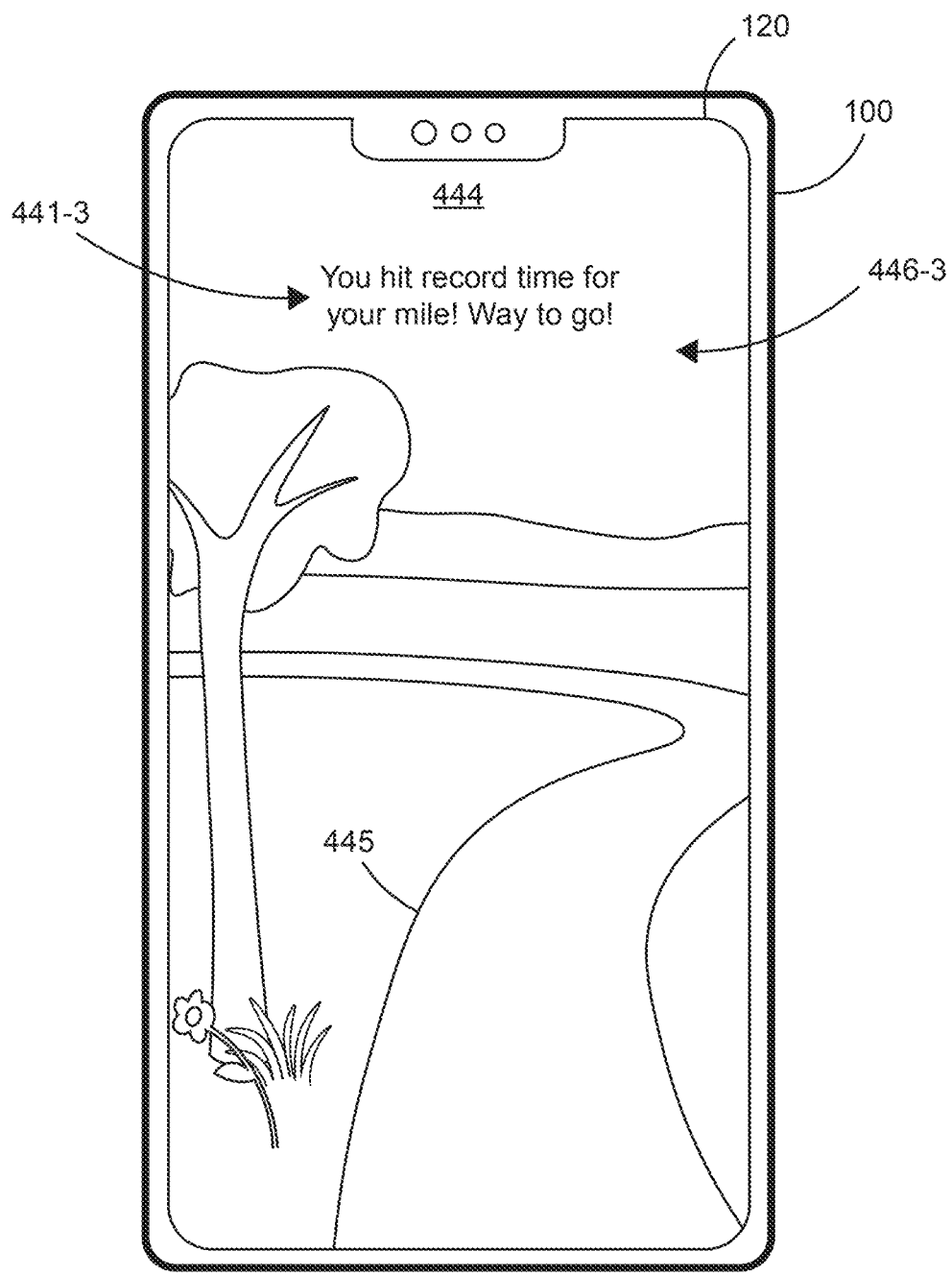

In FIG. 4E, the electronic device 100 transitions to displaying a third image 446-3 in the user interface 444. In some examples, as shown in FIG. 4E, the third image 446-3 includes path 445 corresponding to path 345 in physical environment 340 in FIG. 3J. Particularly, the third image 446-3 includes the portion of the path 445 the user was running on in FIG. 3J when the user achieved their exercise record discussed previously above (e.g., record time for running one mile). As shown in FIG. 4E, the electronic device 100 displays visual indication 441-3 overlaid on the third image 446-3 reminding the user of the achievement they reached during the exercise activity as illustrated previously in FIG. 3J.

Figure 4F:
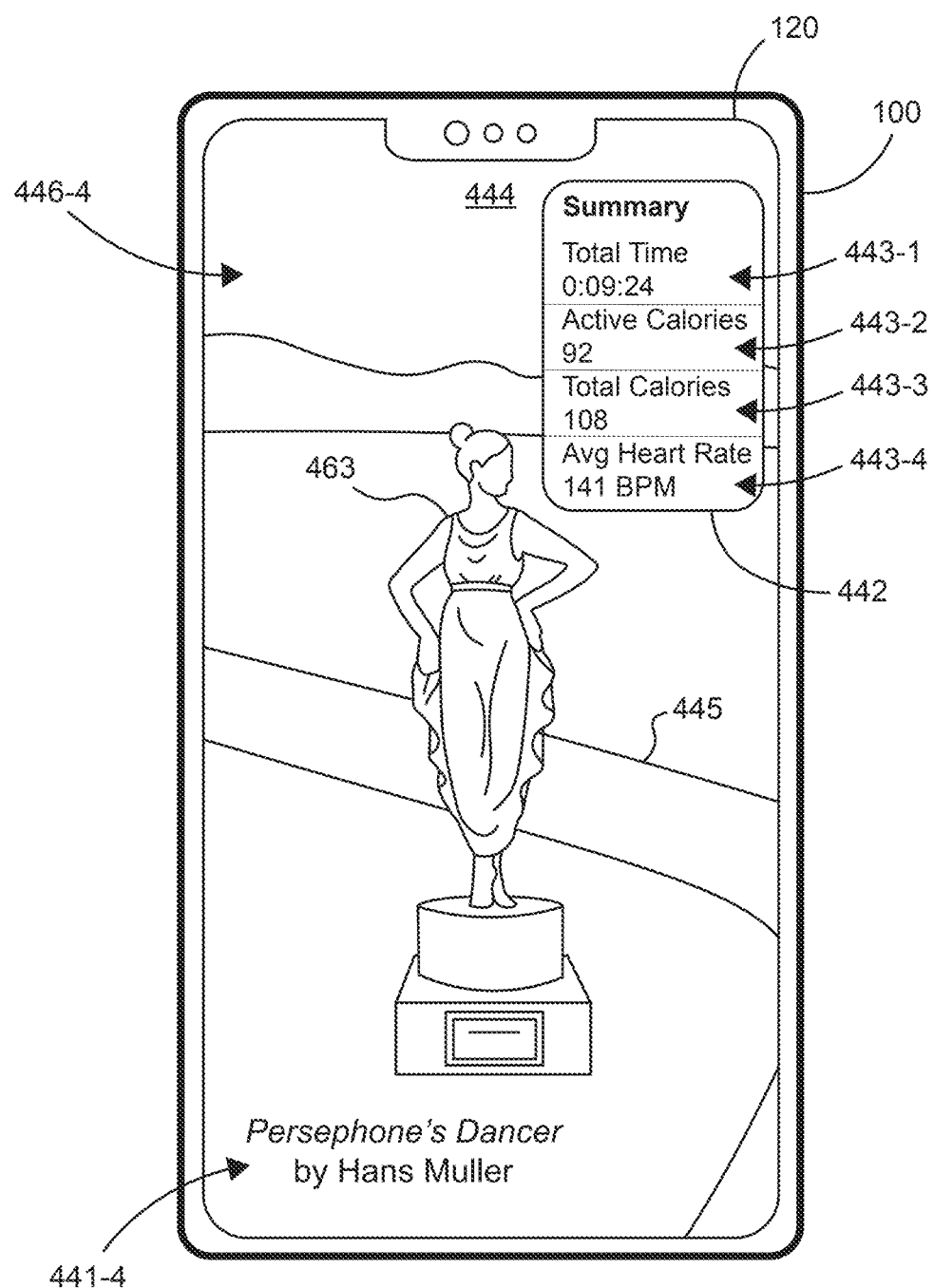

In FIG. 4F, the electronic device 100 transitions to displaying a fourth image 446-4 of the first timelapse. In some examples, as shown in FIG. 4F, the fourth image 446-4 includes another object of interest detected during the exercise activity, particularly statue 463 corresponding to statue 362 in FIGS. 3H-3I. In some examples, as shown in FIG. 4F, displaying the fourth image 446-4 includes displaying visual indication 441-4, which includes information corresponding to the statue 463. For example, as shown in FIG. 4F, the information indicates a name or title of the statue 463 (e.g., Persephone's Dancer) and the artist/sculptor (e.g., Hans Muller). In some examples, the electronic device 100 and/or the electronic device 301 generates the information included in the visual indication 441-4 based on object recognition and/or based on character recognition (e.g., identifying the title of the statue 463 and the artist from a placard or sign posted with the statue in the physical environment).

Additionally, in some examples, as shown in FIG. 4F, the electronic device 100 displays user interface element 442 overlaid on the fourth image 446-6 of the first timelapse. In some examples, as shown in FIG. 4F, the user interface element 442 includes a summary of the one or more fitness metrics associated with the exercise activity discussed above, such as a summary of the one or more fitness metrics represented in first user interface 315 in FIGS. 3A-3K. For example, as shown in FIG. 4F, the user interface element 442 includes an indication 443-1 of a total time of the exercise activity (e.g., 9 minutes and 24 seconds), an indication 443-2 of a number of calories burned during the exercise activity (e.g., 92 active calories), an indication 443-3 of a total number of calories burned (e.g., 108 calories), and an indication 443-4 of the user's average heart rate during the exercise activity (e.g., 141 beats per minute).

Figure 4G:
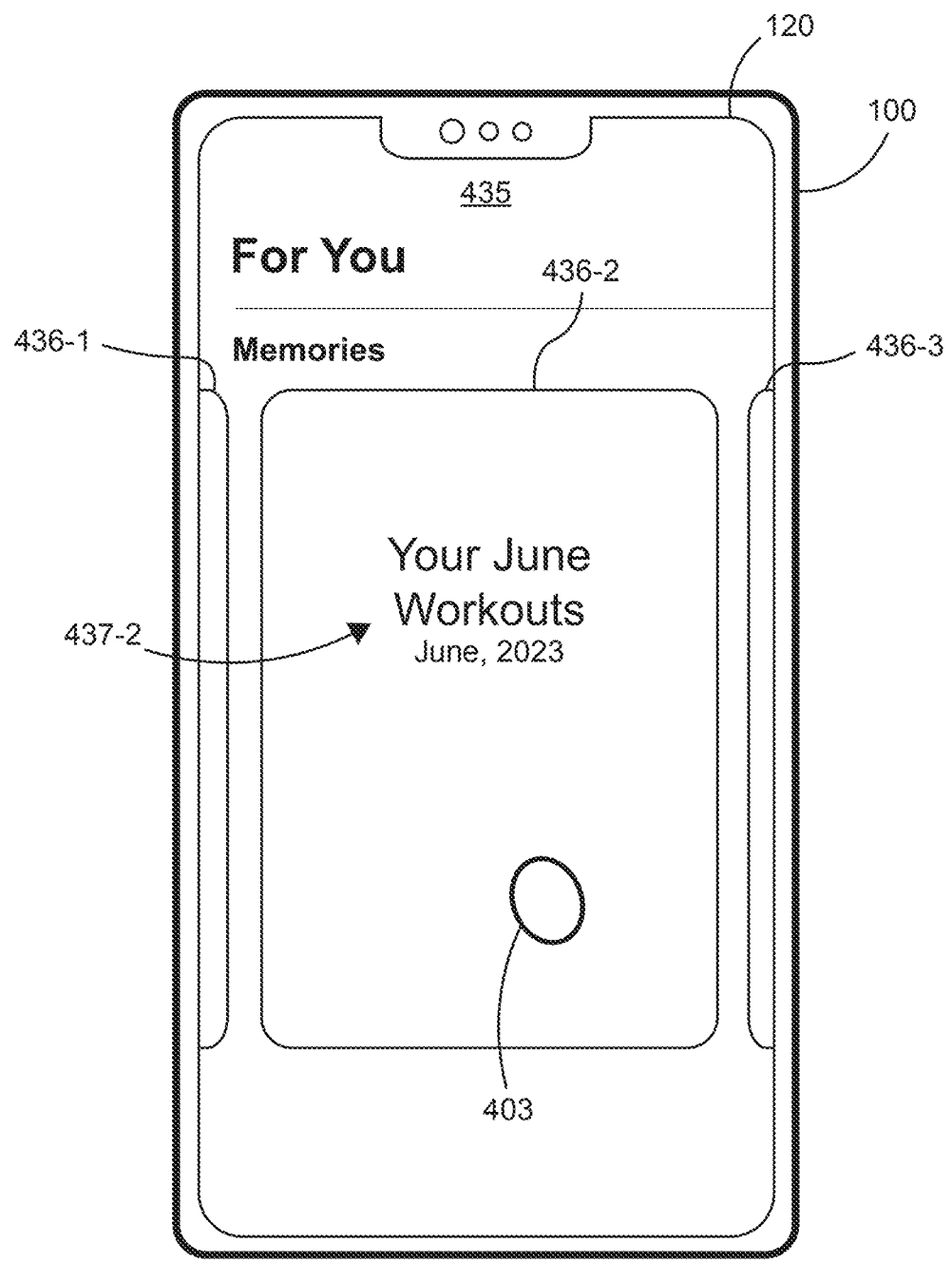

In FIG. 4G, the electronic device 100 is redisplaying the user interface 435 on the touchscreen 120. For example, the electronic device 100 automatically redisplays the user interface 435 after a conclusion of the presentation of the first timelapse discussed above (e.g., after a final image of the first timelapse is displayed in the user interface 444). In some examples, the electronic device 100 redisplays the user interface 435 after detecting user input directed to the user interface 444, such as an input navigating away from the user interface 444 or an input ceasing display of the user interface 444. Additionally, as shown in FIG. 4G, the user interface 435 is presenting the indication 436-2 of the second timelapse in a primary position within the user interface 444. For example, as described previously above, the user interface 435 is (e.g., horizontally) scrollable to reveal additional indications of timelapses, such as indication 436-3 of a third timelapse formulated for the user. In the example of FIG. 4G, the electronic device 100 has optionally received input for scrolling the indications, such that the indication 436-2 is presented in the primary view (e.g., in focus) in the user interface 435.

In some examples, as shown in FIG. 4G, the indication 436-2 includes information 437-2 corresponding to the second timelapse. For example, as similarly discussed above, the indication 436-2 includes a name or title of the second timelapse (e.g., "Your June Workouts") and/or a time associated with the second timelapse (e.g., a day/week/month/year that the second timelapse highlights, such as June 2023). In some examples, as described below, the second timelapse corresponds to a compilation and/or highlight of a plurality of images captured during a plurality of user activities, such as a plurality of exercise activities. For example, in FIG. 4G, the second timelapse includes a plurality of images captured from a plurality of exercise activities of the user that were detected (e.g., by electronic device 301) during the month of June.

In FIG. 4G, the electronic device 100 detects an input corresponding to selection of the indication 436-2 of the second timelapse in the user interface 435. For example, as similarly described above, the electronic device 100 detects a tap of contact 403 on the touchscreen 120 directed to the indication 436-2.

Figure 4H:
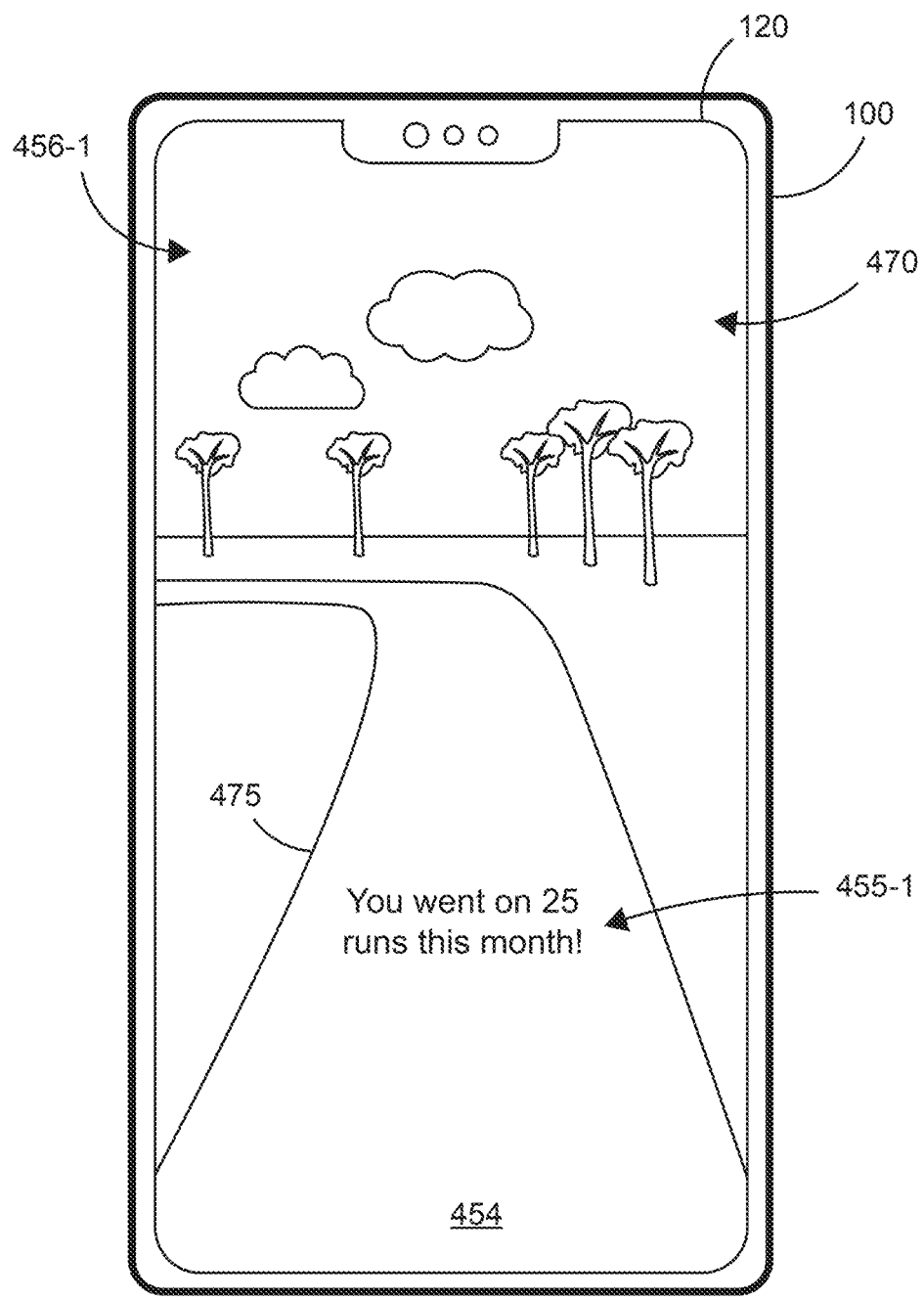

In some examples, as shown in FIG. 4H, in response to detecting the input selecting the indication 436-2, the electronic device 100 initiates presentation of the second timelapse. For example, as similarly described above, the electronic device 100 displays user interface 454 corresponding to the second timelapse. In FIG. 4H, the user interface 454 includes a first image 456-1 captured during a first exercise activity detected during the month of June. In some examples, as shown in FIG. 4H, the first image 456-1 includes a park environment 470 including a path 475 on which the user was running when the first image 456-1 was captured (e.g., by electronic device 301). Additionally, in some examples, as similarly discussed above, the first image 456-1 is displayed with visual indication 455-1 in the user interface 454. For example, as shown in FIG. 4H, the visual indication 455-1 informs the user of a total number of workouts performed during the month of June (e.g., 25 running workouts).

Figure 4I:
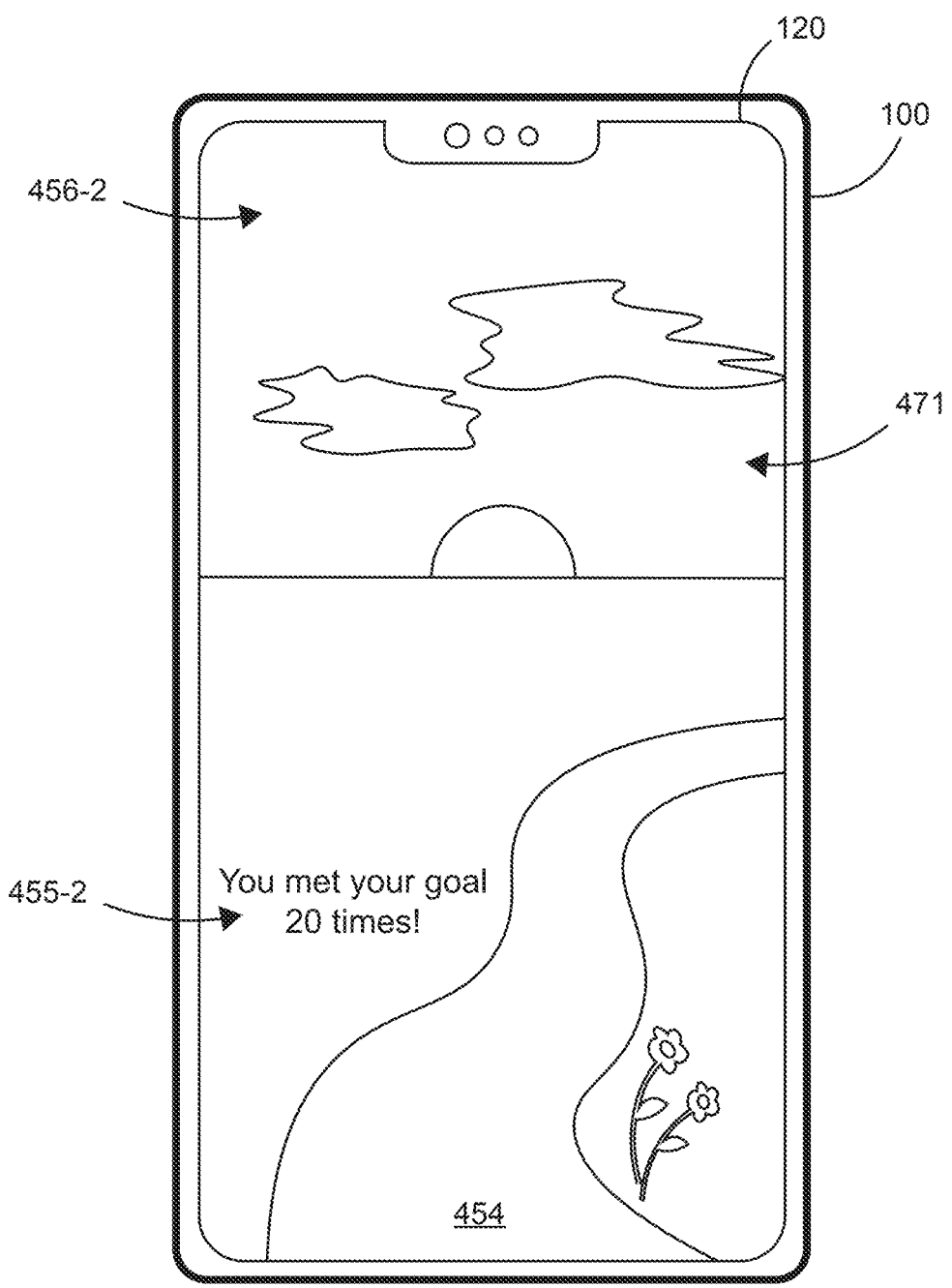

From FIGS. 4H to 4I, the electronic device 100 transitions from displaying the first image 456-1 in the user interface 454 to displaying a second image 456-2 that was captured (e.g., by electronic device 301) during a second exercise activity, different from the first exercise activity of the first image 456-1 (e.g., detected at a different time, such as a different day of the week or a different time of day than the first exercise activity during the month of June). In some examples, as shown in FIG. 4I, the second image 456-2 includes a sunset environment 471 (e.g., sun setting over the horizon at a beach, a park, or other environment) in which the second exercise activity was detected (e.g., by electronic device 301) during the month of June. Additionally, in some examples, as shown in FIG. 4I, the electronic device 100 is displaying visual indication 455-2 overlaid on the second image 456-2 in the user interface 454. In some examples, the visual indication 455-2 provides the user with information corresponding to a number of times during the month of June that the user met a particular exercise-related goal (e.g., 20 times). For example, the goal is a user-selected goal or is selected by the electronic device 301 based on data provided by a fitness application running on the electronic device 301. In some examples, the goal referred to by the visual indication 455-2 is a distance-based goal (e.g., running a particular number of miles), a time-based goal (e.g., running a particular distance (e.g., one mile, two miles, three miles, etc.) in a particular amount of time), a calorie-based goal (e.g., burning a particular number of calories during the exercise activity), or other types of fitness goals.

Figure 4J:
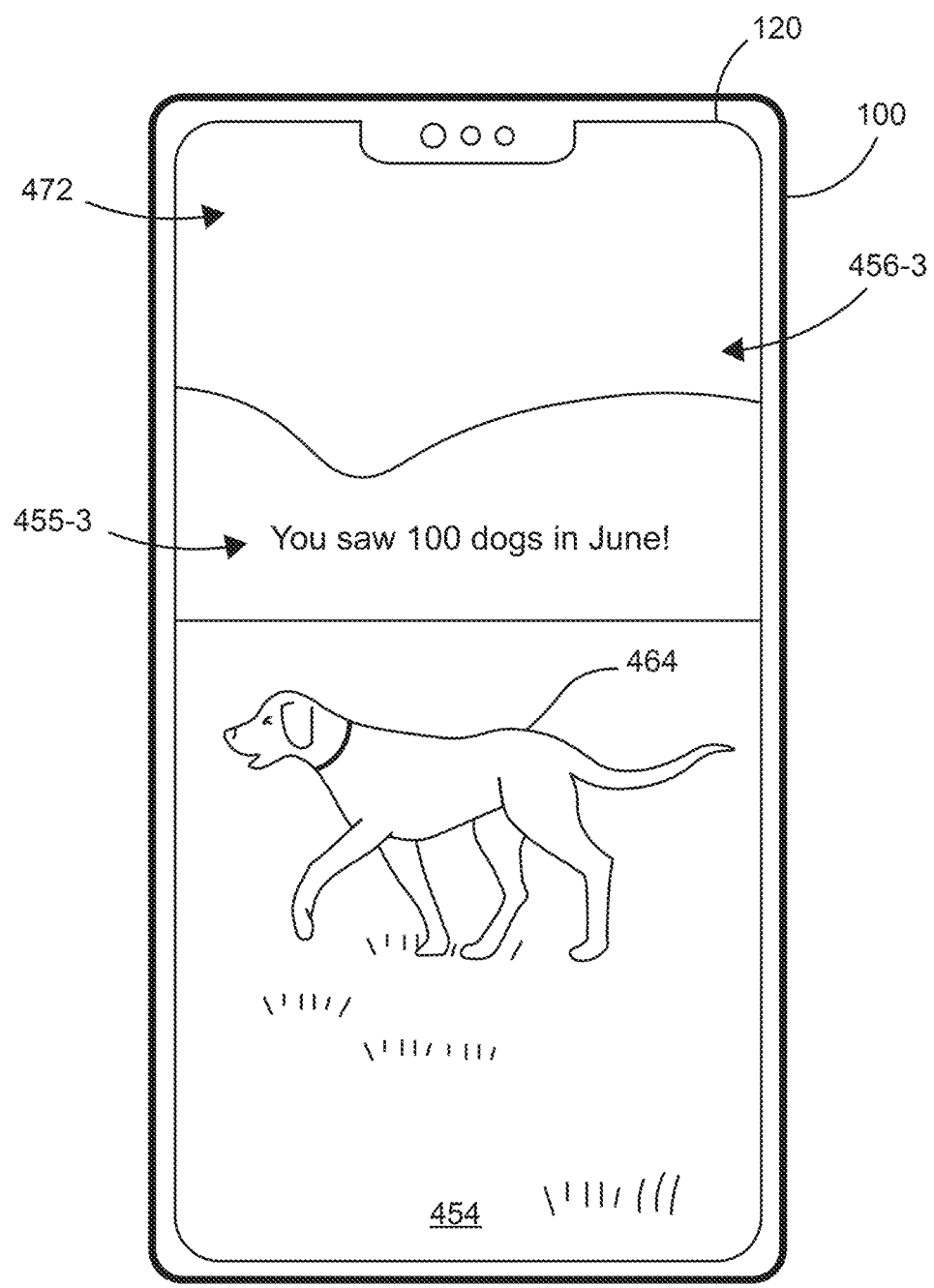

In FIG. 4J, the electronic device 100 transitions to displaying a third image 456-3 in the user interface 454 associated with the second timelapse. For example, as shown in FIG. 4J, the third image 456-3 includes a park environment 472 including dog 464. In some examples, as described herein above, the dog 464 corresponds to an object of interest detected (e.g., by the electronic device 301) during a third exercise activity that occurred in the park environment 472. In some examples, as similarly discussed above, the third exercise activity was detected at a different time than the first exercise activity associated with the first image 456-1 and the second exercise activity associated with the second image 456-2 during the month of June. Additionally, as shown in FIG. 4J, the electronic device 100 is optionally displaying visual indication 455-3 overlaid on the third image 456-3. In some examples, as shown in FIG. 4J, the visual indication 455-3 informs the user of a total number of dogs (e.g., each corresponding to an object of interest) noticed by the user and detected by the electronic device 301. In some examples, the 100 dogs detected by the electronic device 301 during the month of June were detected over the course of the plurality of exercise activities performed by the user during that month.

Figure 4K:
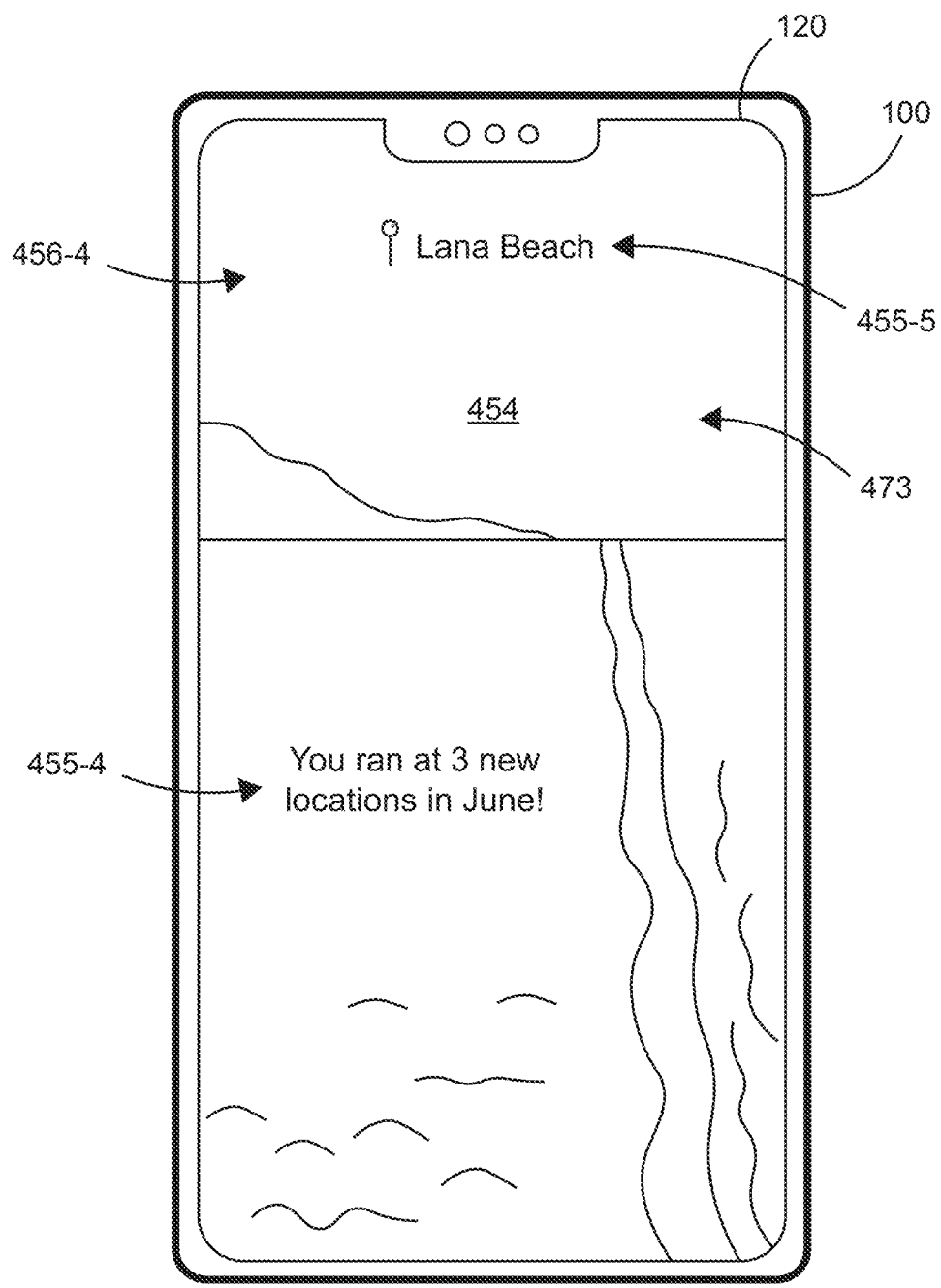

As shown in FIG. 4K, the electronic device 100 is displaying a fourth image 456-4 in the user interface 454 associated with the second timelapse. In some examples, as shown in FIG. 4K, the fourth image 456-4 includes a beach environment 473 in which a fourth exercise activity of the user was detected (e.g., by electronic device 301). In some examples, as similarly described above, the fourth exercise activity was detected at a different time than the first exercise activity associated with the first image 456-1, the second exercise activity associated with the second image 456-2, and the third exercise activity associated with the third image 456-3 during the month of June. In some examples, as shown in FIG. 4K, the fourth image 456-4 is displayed with visual indications 455-4 and 455-5 corresponding to location information associated with the second timelapse. For example, as shown in FIG. 4K, the visual indication 455-4 provides an indication to the user of a number of new locations that the user performed an exercise activity during the month of June (e.g., three new locations), such as locations at which the user has previously never performed a running activity or other exercise activity. As shown in FIG. 4K, the visual indication 455-5 provides an indication of one of the three new locations at which the user performed an exercise activity (e.g., running activity) during the month of June, namely Lana Beach (e.g., illustrated in the fourth image 456-4, which was captured while the user was running at Lana Beach, as similarly discussed herein above).

Accordingly, as outlined above, when the electronic device (e.g., electronic device 301) detects an activity performed by the user of the electronic device, the electronic device captures one or more images of objects of interest in the user's field of view for formulation of a timelapse that enables the user to gain insight into the activity and/or to discover objects previously unnoticed by the user that are present in the one or more images, as one benefit. As another advantage, formulating and presenting timelapses associated with user activities to the user enables the user to track and/or refer back to user progress during the activities, such as records achieved, user trends, and/or user interest, thereby informing further user interaction with the electronic device.

It should be understood that, in the examples above, while the timelapses are described with reference to user exercise activities (e.g., a running or walking activity), timelapses highlighting objects of interest and/or other information may be formulated for other types of user activities. For example, the timelapses may be formulated by the electronic device in accordance with a determination that the location of the electronic device is a new location (e.g., indicative that the user is travelling and/or is on vacation), and not necessarily in response to detecting initiation of an exercise activity. As another example, the timelapses may be formulated by the electronic device based on application data. For example, using data provided by a calendar application running on the electronic device, the electronic device formulates a timelapse in the manner(s) discussed above for particular days of the year, such as holidays, birthdays, user-defined calendar events, and the like.

It is understood that the examples shown and described herein are merely exemplary and that additional and/or alternative elements may be provided within the three-dimensional environment and/or in a respective timelapse for highlighting one or more objects of interest and associated information. It should be understood that the appearance, shape, form and size of each of the various user interface elements and objects shown and described herein are exemplary and that alternative appearances, shapes, forms and/or sizes may be provided. For example, the virtual objects representative of user interfaces (e.g., first user interface 315) may be provided in an alternative shape than a rectangular shape, such as a circular shape, triangular shape, etc. Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 5:
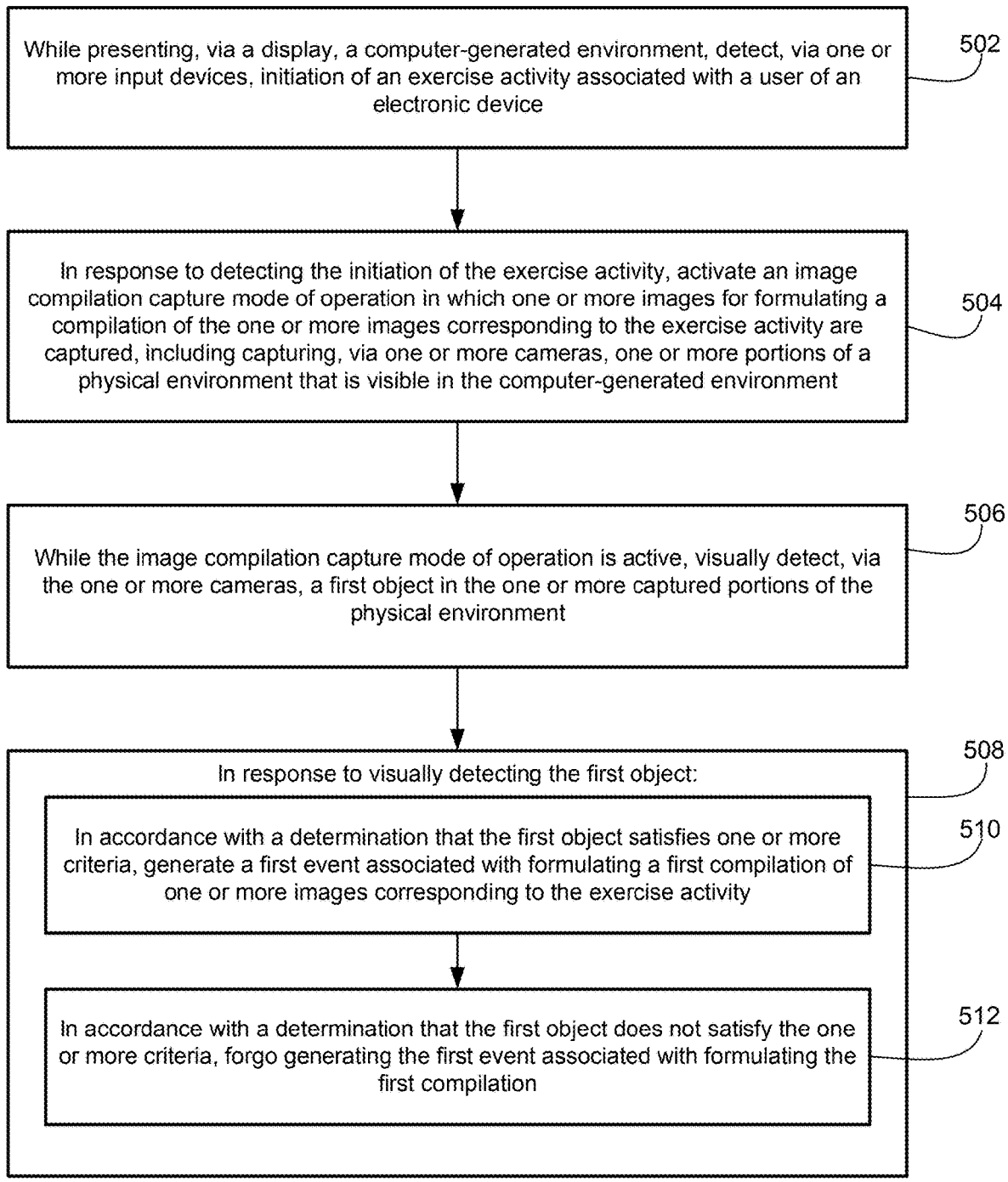
FIG. 5 is a flow diagram illustrating an example process for selectively capturing one or more images for formulation of a timelapse during an exercise activity according to some examples of the disclosure.

FIG. 5 is a flow diagram illustrating an example process for selectively capturing one or more images for formulation of a timelapse during an exercise activity according to some examples of the disclosure. In some examples, process 500 begins at an electronic device in communication with one or more displays, one or more input devices, and one or more cameras. In some examples, the electronic device is optionally a head-mounted display similar or corresponding to device 201 of FIG. 2. As shown in FIG. 5, in some examples, at 502, while presenting, via the display, a computer-generated environment (e.g., a three-dimensional environment), the electronic device detects, via the one or more input devices, initiation of an exercise activity associated with a user of the electronic device. For example, as described with reference to FIG. 3B, the electronic device 301 detects movement of the electronic device caused by movement of the user that corresponds to a running or walking activity.

In some examples, at 504, in response to detecting the initiation of the exercise activity, the electronic device activates an image compilation capture mode of operation in which one or more images for formulating a compilation of the one or more images corresponding to the exercise activity are captured, including capturing, via the one or more cameras, one or more portions of a physical environment that is visible in the computer-generated environment. For example, as described with reference to FIG. 3D, the electronic device 301 activates a timelapse formulation mode of operation during which the electronic device 301 identifies one or more objects of interest in the user's field of view and captures one or more images of the detected objects of interest for formulation of a timelapse associated with the exercise activity.

In some examples, at 506, while the image compilation capture mode of operation is active, the electronic device visually detects, via the one or more cameras, a first object in the one or more captured portions of the physical environment. For example, as described with reference to FIG. 3D, the electronic device 301 visually detects dog 360 in physical environment 340 that is currently visible in the three-dimensional environment 350.

In some examples, at 508, in response to visually detecting the first object, at 510, in accordance with a determination that the first object satisfies one or more criteria, the electronic device generates a first event associated with formulating a first compilation of one or more images corresponding to the exercise activity. For example, as described with reference to FIG. 3E, in accordance with a determination that gaze 321 is directed to the dog 360 for at least a threshold amount of time, represented by time 309 in time bar 308, the electronic device 301 captures one or more images of the dog 360, as indicated by rectangle 325, for formulating a timelapse of the exercise activity. In some examples, at 512, in accordance with a determination that the first object does not satisfy the one or more criteria, the electronic device forgoes generating the first event associated with formulating the first compilation. For example, as described with reference to FIG. 3G, in accordance with determining that tree 361 does not correspond to an object of interest for the user, the electronic device 301 forgoes capturing one or more images of the tree 361 for the formulation of the timelapse of the exercise activity.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at an electronic device in communication with a display, one or more input devices, and one or more cameras: while presenting, via the display, a three-dimensional environment, detecting, via the one or more input devices, initiation of an exercise activity associated with a user of the electronic device; in response to detecting the initiation of the exercise activity, activating an image compilation capture mode of operation in which one or more images for formulating a compilation of the one or more images corresponding to the exercise activity are captured, including capturing, via the one or more cameras, one or more portions of a physical environment that is visible in the three-dimensional environment; while the image compilation capture mode of operation is active, visually detecting a first object in the one or more captured portions of the physical environment; and in response to visually detecting the first object, in accordance with a determination that the first object satisfies one or more criteria, generating a first event associated with formulating a first compilation of one or more images corresponding to the exercise activity, and in accordance with a determination that the first object does not satisfy the one or more criteria, forgoing generating the first event associated with formulating the first compilation.

Additionally or alternatively, in some examples, the one or more criteria correspond to one or more user interest criteria. Additionally or alternatively, in some examples, the one or more user interest criteria are based on user activity. Additionally or alternatively, in some examples, the one or more user interest criteria include a criterion that is satisfied when gaze of the user is directed to the first object for at least a threshold amount of time when the first object is visually detected. Additionally or alternatively, in some examples, the one or more user interest criteria are based on user data obtained from one or more applications running on the electronic device. Additionally or alternatively, in some examples, the one or more criteria include a criterion that is satisfied when the first object has been included in one or more compilations prior to the first compilation. Additionally or alternatively, in some examples, the criterion is satisfied when the first object has been included in the one or more compilations prior to the first compilation fewer than a threshold amount of times. Additionally or alternatively, in some examples, the one or more criteria include a criterion that is satisfied when the first object has not been included in a compilation prior to the first compilation. Additionally or alternatively, in some examples, the method further comprises: while the image compilation capture mode of operation is active, detecting, via the one or more input devices, a conclusion of the exercise activity; and in response to detecting the conclusion of the exercise activity, deactivating the image compilation capture mode of operation, including ceasing capture of the one or more portions of the physical environment that is visible in the three-dimensional environment.

Additionally or alternatively, in some examples, the first object corresponds to a stationary object in the physical environment. Additionally or alternatively, in some examples, the first object corresponds to a nonstationary object in the physical environment. Additionally or alternatively, in some examples, generating the first event includes generating information corresponding to the exercise activity for formulating the first compilation. Additionally or alternatively, in some examples, the information corresponding to the exercise activity includes an indication of the first object. Additionally or alternatively, in some examples, the information corresponding to the exercise activity includes an indication of a location associated with the exercise activity. Additionally or alternatively, in some examples, generating the information corresponding to the exercise activity includes displaying, via the display, a visual indication of the information in the three-dimensional environment while detecting the exercise activity. Additionally or alternatively, in some examples, when the first compilation is formulated, the information corresponding to the exercise activity is overlaid on one or more of the one or more images of the first compilation. Additionally or alternatively, in some examples, generating the first event includes saving an image of the first object to be included in the one or more images of the first compilation. Additionally or alternatively, in some examples, when the first compilation is formulated, the one or more images are presented as a video. Additionally or alternatively, in some examples, the first compilation includes a subset of one or more second compilations corresponding to one or more second exercise activities detected prior to the exercise activity.

Additionally or alternatively, in some examples, the exercise activity is detected within a threshold amount of time of detecting the one or more second exercise activities. Additionally or alternatively, in some examples, when the first compilation is formulated, the one or more images include one or more indications of one or more achievements associated with the exercise activity and the one or more second exercise activities. Additionally or alternatively, in some examples, when the first compilation is formulated, in accordance with the determination that the one or more criteria were satisfied when the first object was visually detected, the one or more images include one or more indications of one or more objects satisfying the one or more criteria, including the first object. Additionally or alternatively, in some examples, the method further comprises, while the image compilation capture mode of operation is active, displaying, via the display, one or more indications associated with one or more fitness metrics corresponding to the exercise activity in the three-dimensional environment. Additionally or alternatively, in some examples, when the first compilation is formulated, the one or more images include a representation of a summary of the one or more fitness metrics. Additionally or alternatively, in some examples, when the first compilation is formulated, in accordance with a determination that the exercise activity is associated with an exercise achievement, the one or more images include a representation of the exercise achievement. Additionally or alternatively, in some examples, generating the first event includes capturing a first image of the first object in the physical environment, and formulating the first compilation that includes the first image of the first object includes, in accordance with a determination that the first image is captured while the electronic device is moving above a movement threshold, applying an image correction technique to the first image.

Additionally or alternatively, in some examples, applying the image correction technique to the first image includes cropping the first image. Additionally or alternatively, in some examples, applying the image correction technique to the first image includes rotating the first image to be within a threshold amount of being aligned to a vertical axis intersecting a horizon of a field of view of the electronic device. Additionally or alternatively, in some examples, applying the image correction technique to the first image includes forgoing including the first image in the first compilation in accordance with a determination that a vertical axis intersecting a viewpoint of the electronic device is greater than a threshold amount of being normal to a horizon of a field of view of the electronic device. Additionally or alternatively, in some examples, the method further comprises: while the image compilation capture mode of operation is active, visually detecting, via the one or more cameras, a second object, different from the first object, in the one or more captured portions of the physical environment; and in response to visually detecting the second object, in accordance with a determination that the second object satisfies the one or more criteria, generating a second event, different from the first event, associated with formulating the first compilation of one or more images corresponding to the exercise activity, and in accordance with a determination that the second object does not satisfy the one or more criteria, forgoing generating the second event associated with formulating the first compilation Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
at an electronic device in communication with a display, one or more input devices, and one or more cameras:
while presenting, via the display, a three-dimensional environment, detecting, via the one or more input devices, initiation of an exercise activity associated with a user of the electronic device;
in response to detecting the initiation of the exercise activity, activating an image compilation capture mode of operation in which one or more respective images for formulating a respective compilation of the one or more respective images corresponding to the exercise activity are captured, including capturing, via the one or more cameras, one or more portions of a physical environment that is visible in the three-dimensional environment;
while the image compilation capture mode of operation is active, visually detecting a first object in the one or more captured portions of the physical environment; and
in response to visually detecting the first object:
in accordance with a determination that the first object satisfies one or more criteria, generating a first event associated with formulating a first compilation of one or more first images corresponding to the exercise activity; and
in accordance with a determination that the first object does not satisfy the one or more criteria, forgoing generating the first event associated with the formulating the first compilation.

2. The method of claim 1, wherein the one or more criteria include a criterion that is satisfied when gaze of the user is directed to the first object for at least a threshold amount of time when the first object is visually detected.

3. The method of claim 1, wherein the one or more criteria are based on user data obtained from one or more applications running on the electronic device.

4. The method of claim 1, wherein the one or more criteria include a criterion that is satisfied when the first object has been included in one or more compilations prior to the first compilation.

5. The method of claim 1, wherein generating the first event includes generating information corresponding to the exercise activity for formulating the first compilation.

6. The method of claim 5, wherein, when the first compilation is formulated, the information corresponding to the exercise activity is overlaid on one or more of the one or more first images of the first compilation.

7. The method of claim 1, wherein generating the first event includes saving an image of the first object to be included in the one or more first images of the first compilation.

8. The method of claim 1, wherein:
generating the first event includes capturing a first image of the first object in the physical environment; and
formulating the first compilation that includes the first image of the first object includes, in accordance with a determination that the first image is captured while the electronic device is moving above a movement threshold, applying an image correction technique to the first image.

9. An electronic device comprising:
one or more processors;
memory; and
one or more programs stored in the memory and configured to be executed by the one or more processors, the one or more programs including instructions for performing a method comprising:
while presenting, via a display, a three-dimensional environment, detecting, via one or more input devices, initiation of an exercise activity associated with a user of the electronic device;
while presenting, via a display, a three-dimensional environment, detecting, via one or more input devices, initiation of an exercise activity associated with a user of the electronic device;
in response to detecting the initiation of the exercise activity, activating an image compilation capture mode of operation in which one or more respective images for formulating a respective compilation of the one or more respective images corresponding to the exercise activity are captured, including capturing, via one or more cameras, one or more portions of a physical environment that is visible in the three-dimensional environment;
while the image compilation capture mode of operation is active, visually detecting a first object in the one or more captured portions of the physical environment; and
in response to visually detecting the first object:
in accordance with a determination that the first object satisfies one or more criteria, generating a first event associated with formulating a first compilation of one or more first images corresponding to the exercise activity; and
in accordance with a determination that the first object does not satisfy the one or more criteria, forgoing generating the first event associated with the formulating the first compilation.

10. The electronic device of claim 9, wherein the one or more criteria include a criterion that is satisfied when gaze of the user is directed to the first object for at least a threshold amount of time when the first object is visually detected.

11. The electronic device of claim 9, wherein the one or more criteria are based on user data obtained from one or more applications running on the electronic device.

12. The electronic device of claim 9, wherein the one or more criteria include a criterion that is satisfied when the first object has been included in one or more compilations prior to the first compilation.

13. The electronic device of claim 9, wherein generating the first event includes generating information corresponding to the exercise activity for formulating the first compilation.

14. The electronic device of claim 13, wherein, when the first compilation is formulated, the information corresponding to the exercise activity is overlaid on one or more of the one or more first images of the first compilation.

15. The electronic device of claim 9, wherein generating the first event includes saving an image of the first object to be included in the one or more first images of the first compilation.

16. The electronic device of claim 9, wherein:
generating the first event includes capturing a first image of the first object in the physical environment; and
formulating the first compilation that includes the first image of the first object includes, in accordance with a determination that the first image is captured while the electronic device is moving above a movement threshold, applying an image correction technique to the first image.

17. A non-transitory computer readable storage medium storing one or more programs, the one or more programs comprising instructions, which when executed by one or more processors of an electronic device, cause the electronic device to perform a method comprising:
while presenting, via a display, a three-dimensional environment, detecting, via one or more input devices, initiation of an exercise activity associated with a user of the electronic device;
in response to detecting the initiation of the exercise activity, activating an image compilation capture mode of operation in which one or more respective images for formulating a respective compilation of the one or more respective images corresponding to the exercise activity are captured, including capturing, via one or more cameras, one or more portions of a physical environment that is visible in the three-dimensional environment;
while the image compilation capture mode of operation is active, visually detecting a first object in the one or more captured portions of the physical environment; and
in response to visually detecting the first object:
in accordance with a determination that the first object satisfies one or more criteria, generating a first event associated with formulating a first compilation of one or more first images corresponding to the exercise activity; and
in accordance with a determination that the first object does not satisfy the one or more criteria, forgoing generating the first event associated with the formulating the first compilation.

18. The non-transitory computer readable storage medium of claim 17, wherein the one or more criteria include a criterion that is satisfied when gaze of the user is directed to the first object for at least a threshold amount of time when the first object is visually detected.

19. The non-transitory computer readable storage medium of claim 17, wherein the one or more criteria are based on user data obtained from one or more applications running on the electronic device.

20. The non-transitory computer readable storage medium of claim 17, wherein the one or more criteria include a criterion that is satisfied when the first object has been included in one or more compilations prior to the first compilation.

21. The non-transitory computer readable storage medium of claim 17, wherein generating the first event includes generating information corresponding to the exercise activity for formulating the first compilation.

22. The non-transitory computer readable storage medium of claim 21, wherein, when the first compilation is formulated, the information corresponding to the exercise activity is overlaid on one or more of the one or more first images of the first compilation.

23. The non-transitory computer readable storage medium of claim 17, wherein generating the first event includes saving an image of the first object to be included in the one or more first images of the first compilation.

24. The non-transitory computer readable storage medium of claim 17, wherein:
generating the first event includes capturing a first image of the first object in the physical environment; and
formulating the first compilation that includes the first image of the first object includes, in accordance with a determination that the first image is captured while the electronic device is moving above a movement threshold, applying an image correction technique to the first image.

* * * * *